(12) United States Patent
Thompson et al.

(10) Patent No.: US 9,658,733 B2
(45) Date of Patent: May 23, 2017

(54) USER INTERFACE WITH SELECTION PATTERNS

(75) Inventors: Jon Thompson, Des Moines, IA (US); Michael David Naughton, Ames, IA (US)

(73) Assignee: Stickshift, LLC, Des Moines, IA (US)

( * ) Notice: Subject to any disclaimer, the term of this patent is extended or adjusted under 35 U.S.C. 154(b) by 0 days.

(21) Appl. No.: 13/566,702

(22) Filed: Aug. 3, 2012

(65) Prior Publication Data

US 2014/0040834 A1    Feb. 6, 2014

(51) Int. Cl.
*G06F 3/0482* (2013.01)
*G06F 3/0481* (2013.01)
*G06F 3/0488* (2013.01)
*G06F 3/01* (2006.01)

(52) U.S. Cl.
CPC .......... *G06F 3/0481* (2013.01); *G06F 3/0482* (2013.01); *G06F 3/04812* (2013.01); *G06F 3/013* (2013.01); *G06F 3/0488* (2013.01)

(58) Field of Classification Search
CPC ............................. G06F 3/0481; G06F 3/0482
USPC .......................................................... 715/856
See application file for complete search history.

(56) References Cited

U.S. PATENT DOCUMENTS

| | | | | |
|---|---|---|---|---|
| 8,245,156 B2 * | 8/2012 | Mouilleseaux | ....... | G06F 3/0482 715/834 |
| 8,707,211 B2 * | 4/2014 | Yasui | .................. | G06F 3/0482 715/834 |
| 8,826,181 B2 * | 9/2014 | Mouilleseaux | ....... | G06F 3/0482 715/834 |
| 2005/0076309 A1 * | 4/2005 | Goldsmith | ................. | 715/811 |
| 2005/0210410 A1 * | 9/2005 | Ohwa et al. | ................. | 715/821 |
| 2006/0248475 A1 * | 11/2006 | Abrahamsson | ....... | G06F 3/0482 715/835 |
| 2006/0267966 A1 * | 11/2006 | Grossman | ............. | G06F 3/0346 345/179 |
| 2007/0184953 A1 * | 8/2007 | Luberski | ................ | A63B 22/18 482/146 |
| 2007/0198949 A1 * | 8/2007 | Rummel | ............... | G06F 3/0482 715/810 |
| 2007/0247394 A1 * | 10/2007 | Boyan | ................... | G06F 3/0482 345/23 |
| 2008/0072177 A1 * | 3/2008 | Santos et al. | ................. | 715/821 |
| 2008/0234045 A1 * | 9/2008 | Mezen | .......................... | 463/37 |
| 2009/0288043 A1 * | 11/2009 | Willis | ........................ | 715/859 |
| 2010/0100849 A1 * | 4/2010 | Fram | ........................... | 715/835 |
| 2010/0185985 A1 * | 7/2010 | Chmielewski | ........ | G06F 3/0482 715/834 |

(Continued)

OTHER PUBLICATIONS

Allmazegames.com, "labrink", May 23, 2012, http://www.allmazegames.com/play/labyrink.htm.*

*Primary Examiner* — Reza Nabi
*Assistant Examiner* — Daniel Rodriguez
(74) *Attorney, Agent, or Firm* — David M. Breiner; BrownWinick Law Firm

(57) ABSTRACT

Example embodiments relate to a user interface. In particular, example embodiments are drawn to a user interface associated with a touch sensitive screen. Example embodiments are also drawn to a computer readable medium configured to generate a selection pattern upon which a pointer may be moved to at least one representation, track a movement of the pointer on the selection pattern, and generate a new selection pattern in response to the pointer being moved to the at least one representation.

16 Claims, 33 Drawing Sheets

(56) References Cited

U.S. PATENT DOCUMENTS

| | | | |
|---|---|---|---|
| 2010/0192101 A1* | 7/2010 | Chmielewski | G06F 3/0482 715/834 |
| 2010/0192102 A1* | 7/2010 | Chmielewski | G06F 3/04817 715/834 |
| 2010/0192103 A1* | 7/2010 | Cragun | G06F 3/04817 715/834 |
| 2010/0251179 A1* | 9/2010 | Cragun | G06F 3/04812 715/834 |
| 2010/0251180 A1* | 9/2010 | Cragun | G06F 3/04812 715/834 |
| 2010/0269040 A1* | 10/2010 | Lee | G06F 3/04817 715/702 |
| 2010/0299637 A1* | 11/2010 | Chmielewski | G06F 3/0482 715/834 |
| 2010/0306702 A1* | 12/2010 | Warner | G06F 3/0482 715/811 |
| 2010/0313156 A1* | 12/2010 | Louch et al. | 715/769 |
| 2011/0055760 A1* | 3/2011 | Drayton et al. | 715/834 |
| 2011/0066980 A1* | 3/2011 | Chmielewski | G06F 3/0482 715/834 |
| 2011/0066981 A1* | 3/2011 | Chmielewski | G06F 3/0482 715/834 |
| 2012/0066647 A1* | 3/2012 | Ullmann | 715/841 |
| 2012/0113008 A1* | 5/2012 | Makinen | G06F 3/016 345/168 |
| 2013/0346861 A1* | 12/2013 | Herpel | G06F 9/4443 715/716 |
| 2014/0009395 A1* | 1/2014 | Ku et al. | 345/157 |

\* cited by examiner

USER INTERFACE WITH SELECTION PATTERNS

BACKGROUND

1. Field

Example embodiments relate to a user interface. In particular, example embodiments are drawn to an electronic device having a touch sensitive area connected to a processer configured to track a touch on the touch sensitive area and generate selection patterns upon which a pointer may be moved.

2. Description of the Related Art

Conventional touch screens serve as a user interface in various types of electronic devices. For example, conventional touch screens may be found in electronic devices such as kiosks, hand held games, cell phones, ATMs, and computers. In some conventional electronic devices, touch screens are combined with display devices that display program icons associated with various programs. In these devices, the touch screens are normally placed over the display devices. Because conventional touch screens are either transparent or substantially transparent, the program icons displayed by the display devices are visible through the touch screen.

In the conventional art, the display devices having the touch screens mounted thereon are generally controlled by processers that receive data from the touch screens. In these devices, a user may activate a program by touching a region of the touch screen under which the program's icon is displayed. For example, a user may activate a program by "tapping" the program's displayed icon through the touch screen.

Recently, some manufacturers have turned to "swiping" as a means of inputting data to a processer of an electronic device. "Swiping," as used in this application, refers to an uninterupted movement of an object across at least a portion of a touch sensitive screen. In some conventional devices, a "swiping" motion is detected by a processor which then activates certain programs. For example, U.S. Pat. No. 8,095,879 uses a "swiping" motion to activate various groups of icons in a display area of a touch screen. In this particular reference, a group of icons may be displayed if a "swiping" motion is detected over a point within a menu area of a display screen. As another example, U.S. Pat. No. 7,250,938 provides a technology in which a user performs a "swiping" motion across a digitally displayed keyboard. In this particular example, a computer may use the "swiping" motion of the user to generate words for text messaging.

SUMMARY

Example embodiments relate to a user interface. In particular, example embodiments are drawn to an electronic device having a touch sensitive area connected to a processer configured to track a touch on the touch sensitive area and generate selection patterns upon which a pointer may be moved.

Example embodiments are also drawn to a computer readable medium configured to cause a processer to generate a selection pattern upon which a pointer may be moved to at least one representation, track a movement of the pointer on the selection pattern, and generate a new selection pattern in response to the pointer being moved to the at least one representation.

In accordance with example embodiments, a system may include a display device, a touch sensitive device, and a processor configured to cause the display device to display a plurality of selection patterns upon which a pointer is moved.

BRIEF DESCRIPTION OF THE DRAWINGS

Example embodiments are described in detail below with reference to the attached drawing figures, wherein.

DETAILED DESCRIPTION

Figure 1:
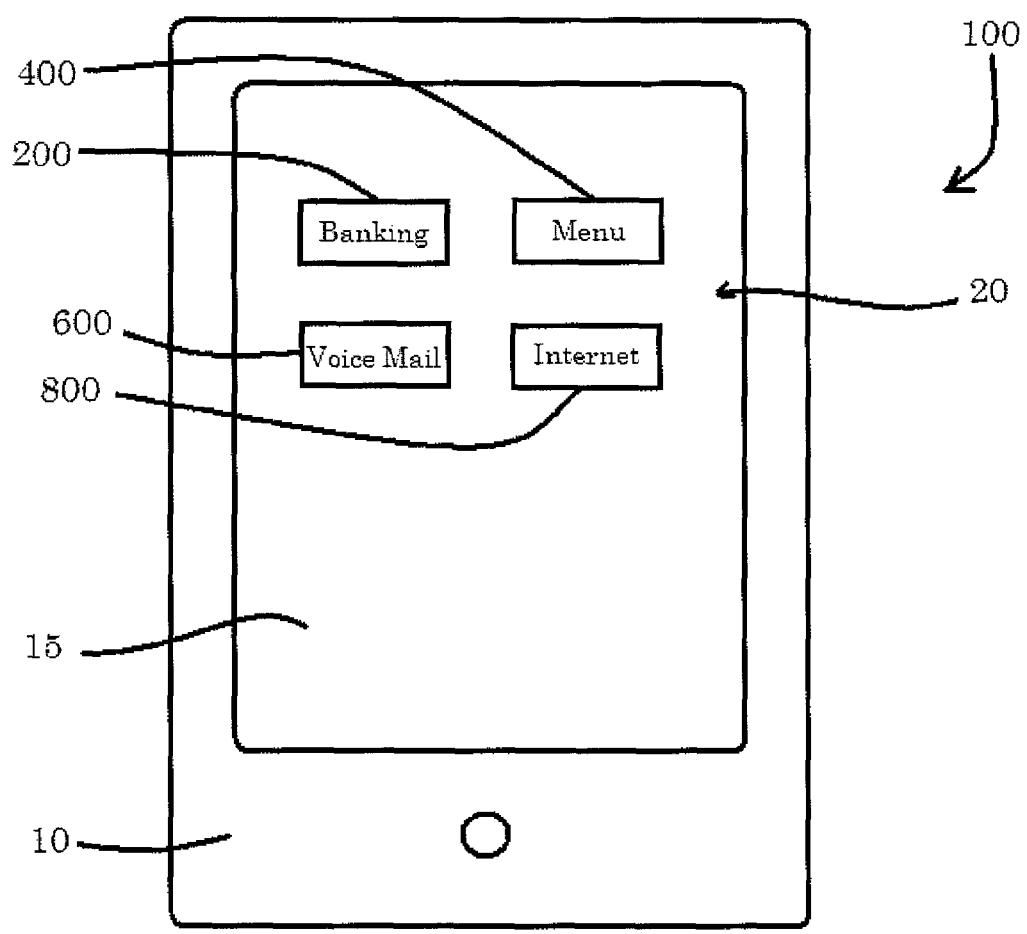
FIG. 1 is a view of a conventional electronic device usable with example embodiments.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These teens are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a computer interface.

FIG. 1 is a view of an electronic device 100 in accordance with example embodiments. In example embodiments, the electronic device 100 may be a handheld device that includes a touch sensitive area 15 supported by a frame 10. For example the touch sensitive area 15 may be a touch sensitive device, for example, a touch screen, mounted on a display device. In FIG. 1, item 15, therefore, may represent a display device in addition to representing a touch sensitive device. The touch sensitive device, for example, may be a resistive or capacitive type touch screen, as is well known in the art. The display device may be a liquid crystal display device as is also well known in the art. Thus, because the touch sensitive area 15 may be a touch screen combined with a display device, the touch sensitive area 15 may be configured to not only sense a touch (for example, by a finger or a stylus) but may also be configured to display various images, for example, icons. In example embodiments, the frame 10 may be a conventional frame such as a case of a cell phone or a personal digital assistant. Although the example electronic device 100 has been described as a handheld device example embodiments are not limited thereto. For example, the electronic device 100 may associated with a computer system that includes a touch sensitive screen, for example, an ATM or a kiosk.

In example embodiments, the electronic device 100 may further include a processor configured to receive data from the touch sensitive area 15. For example, in the event the touch sensitive area 15 is comprised of a touch screen mounted on a display device, the processor may receive data from the touch screen. For example, the processor may receive data regarding a location of a touch on the touch sensitive area 15 and may use that data to control the display device. For example, the processor may cause the display to display icons or selection patterns (which will be explained shortly) based on input from the touch screen. In example embodiments, the touch sensitive area 15 sends data regarding a location of a touch to the processor, accordingly, the processor, receiving data from the touch sensitive area 15, may enable a touch on the touch sensitive area 15 to be tracked. In example embodiments, a selection pattern may be considered a pattern upon which a pointer may be moved and the selection pattern may be comprised of various lines and/or arcs which may form a pattern, for example, a tree or ladder shaped pattern. A selection pattern may also be comprised of areas of a screen, rather than the whole screen, upon which the pointer may be moved. For example, rather than forming the selection pattern as a line, the selection pattern may resemble a relatively thin rectangular area upon which the pointer is moved.

In example embodiments the electronic device 100 may include a computer readable medium, for example, a RAM chip and/or a ROM chip having instructions thereon which cause the processor to execute various operations. The instructions, however, are not required to be either on a RAM chip or a ROM chip. The instructions, for example, may be on a computer readable disc such as a blue ray disc, a DVD disc, and/or a CD ROM. In the alternative, the instructions may be on another type of computer readable medium such as a flash drive. In example embodiments, the computer readable medium may be configured to cause a processor to execute any and/or all of the operations provided for in this application. In the alternative, the electronic device 100 may be hard coded to execute any and all operations disclosed in this application.

As indicated above, the touch sensitive area 15 may include a display device with a touch screen configured to sense a touch. Thus, the touch sensitive area 15 may be configured to sense a touch and display at least one image 20. For example, in FIG. 1, four images 200, 400, 600, and 800 may be displayed on the touch sensitive area 15. The first image 200 may be an icon associated with a banking application. The second image 400 may be an icon associated with a restaurant menu application. The third image 600 may be an icon associated with a messaging application, for example, voice mail, email, or text messaging. The fourth image 800 may be an icon associated with an application that provides access to the internet. Although four images 200, 400, 600, and 800 are shown on the touch sensitive area 15, example embodiments are not limited thereto as there may be less than four images shown on the touch sensitive area 15 or more than four images shown. For example, the touch sensitive screen 15 may be configured to display one hundred images or no images. In addition, example embodiments are not limited to applications which consist of a banking application, a menu application, a voice mail application, or an internet access application as the instant applications are for purposes of illustration only.

In example embodiments, applications associated with the first through fourth images 200, 400, 600, and 800 may be launched by simply tapping a region of the touch sensitive area 15 corresponding to one of the first through fourth images. For example, an application associated with the first image 200 may be launched when a user taps his finger, or another object such as a stylus, on a region of the touch sensitive area 15 corresponding to the first image 200. Example embodiments, however, are not limited thereto as the application may be launched in other manners such as sliding one's finger across the region of the touch sensitive area 15 corresponding to the first image 200. In example embodiments, the first image 200 is illustrated as being associated with a banking application, however, the banking application is merely provided for purposes of illustration only and is not meant to be limiting of example embodiments.

In example embodiments, a pointer 900 and at least one selection pattern may be generated by the electronic device 100 and displayed on the touch sensitive area 15 when an application is launched. The pointer 900 may resemble a computer generated "dot" which may be displayed on the touch sensitive area 15 and visible through the touch screen. For example, in the event the touch sensitive area 15 includes a display with a touch screen mounted thereon, the pointer 900 may be generated by the display. In example embodiments, the "dot" shaped pointer is not meant to be a limiting feature of example embodiments. For example, the pointer 900 may alternatively resemble a square, an arrow, a circle, a half circle, a triangle, a hexagon, a photograph, a drawing, or an abstract shape. In addition, the pointer may not be visually generated at all. For example, the pointer may simply be a point where an objects contacts the screen. However, for the sake of simplicity, the pointer 900 is illustrated in the figures as a darkened circle.

In example embodiments, the pointer 900 may be moved when a user places an object, for example, a finger or a stylus, on the region of the touch sensitive area 15 where the pointer 900 is displayed. In example embodiments, the pointer 900 may be moved by swiping the object along the selection pattern. In example, embodiments, a selection pattern is a path upon which the pointer 900 may be moved. In example embodiments, the selection pattern may be a pattern generated by a processer and the pattern may be predetermined, predefined, or preset, however, example embodiments are not limited thereto. For example, the electronic device 100 may be equipped with a processor that randomly generates selection patterns based on predetermined, predefined, or preset criteria, or generates a pattern based on certain criteria that may or may not be preset.

Figure 2A:
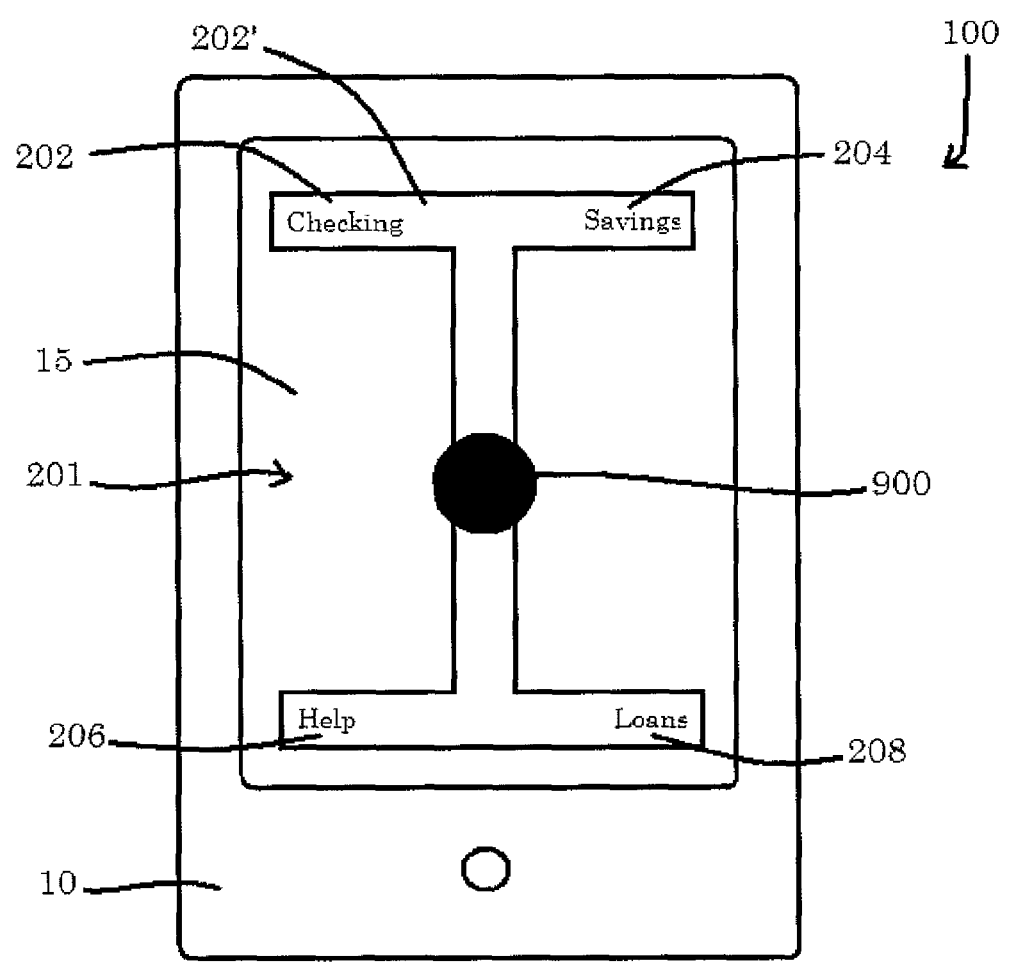
FIGS. 2A-2H illustrate an example of an electronic device having selection patterns generated thereon.

FIG. 2A provides an example of a first selection pattern 201 associated with a banking application. For example, if a user tapped a region of the touch sensitive area 15 corresponding to the first image 200, the electronic device 100 may display the first selection pattern 201 with the pointer 900 superimposed thereon. As shown in FIG. 2A, the first selection pattern 201 is displayed in the touch sensitive area 15. For example, as explained above, the touch sensitive area 15 may include a display configured to display various images. The display may be controlled by a processer to display the first selection pattern 201.

As shown in FIG. 2A, the first selection pattern 201 may resemble an "I" shaped pattern with four representations 202, 204, 206, and 208 illustrated thereon. Each representation may enable a second selection pattern to be generated in the event the pointer 900 is moved thereon. In example embodiments, the pointer 900 may be moved by a user when the user contacts an object, for example, a finger or a stylus, on a region of the touch sensitive area 15 where the pointer 900 is displayed and moves the object (for example, by swiping) along the selection pattern. For example, if a user were to contact an object, for example, a finger or a stylus, on the touch sensitive area 15 corresponding to the first pointer 900 and slide the object across a portion of the touch sensitive area 15 corresponding to the first selection pattern 201 to the first representation 202 "Checking" (see FIG. 2B), the processor would move the pointer 900 to the first representation 202 "Checking" and generate a second selection pattern with additional representations. On the other hand, if the user were to move the first pointer 900 to the second representation "Savings" 204, another selection pattern with additional representations may be generated. As yet another example, if the user were to move the first pointer 900 to the third representation "Loans" 208, yet a different selection pattern illustrating additional representations may be generated.

As alluded to earlier, the touch sensitive area 15 may include a touch screen connected to a processor. Thus, the processor may track a position of the object as it is being moved by the user and may utilize the tracked positions to generate the second selection patterns. In example embodiments, the processer may control the pointer 900 so that it is moved with the object touching the touch screen and will only move the pointer 900 provided the object touching the touchscreen touches the touchscreen at a location corresponding to the selection pattern. If the user were to try to move the pointer 900 by moving the object on a region of the touch screen outside of the selection pattern, the pointer 900 would simply stop moving.

In example embodiments, a second selection pattern may be generated as soon as a user moves the pointer 900 across one of the first, second, third, and fourth representations 202, 204, 206, and 208, however example embodiments are not limited thereto. For example, the second selection pattern may be generated after the pointer 900 is moved to one of the first, second, third, and fourth representations 202, 204, 206, and 208 and then moved away from the one of the first, second, third, and fourth representations 202, 204, 206, and 208. For example, the second selection pattern may be generated after the pointer 900 is moved to one of the first, second, third and fourth representations 202, 204, 206, and 208 and then moved away from one of the first, second, third and fourth representations 202, 204, 206, and 208 along a branch of the selection pattern adjacent the representation. As yet another example, the second selection pattern may be generated by moving the pointer 900 to one of the first, second, third and fourth representations 202, 204, 206, and 208 and tapping the one of the first, second, third and fourth representations 202, 204, 206, and 208.

Figure 2B:
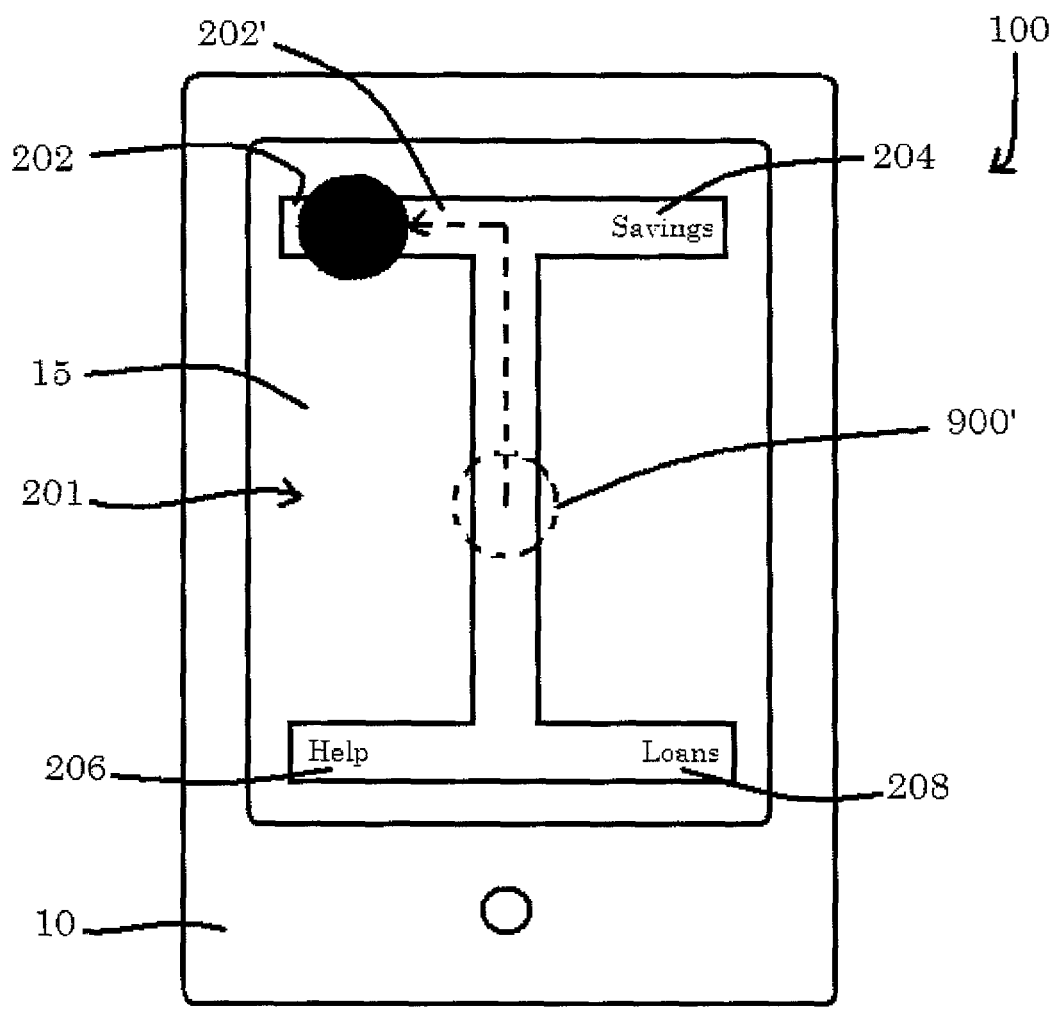

In example embodiments a user may move the pointer 900 along a selection pattern by gliding an object, for example, a finger or a stylus, across the touch sensitive area 15 and within the borders of the selection pattern. In the event the user moves the object outside of the borders forming the first selection pattern 201, the pointer 900 may move back to its point of origination, for example, at 900' as shown in FIG. 2B. On the other hand, example embodiments also include an embodiment wherein the pointer 900 would simply stop moving if the object moves outside of the borders forming the selection pattern 201. Similarly, if a user were to lift the object from the touch sensitive area 15 while moving the pointer 900 along a selection pattern, the pointer 900 may move back to its starting position. On the other hand, example embodiments also include an embodiment wherein the pointer 900 would simply stop moving if the object was lifted off of the touch sensitive area 15.

Figure 2C:
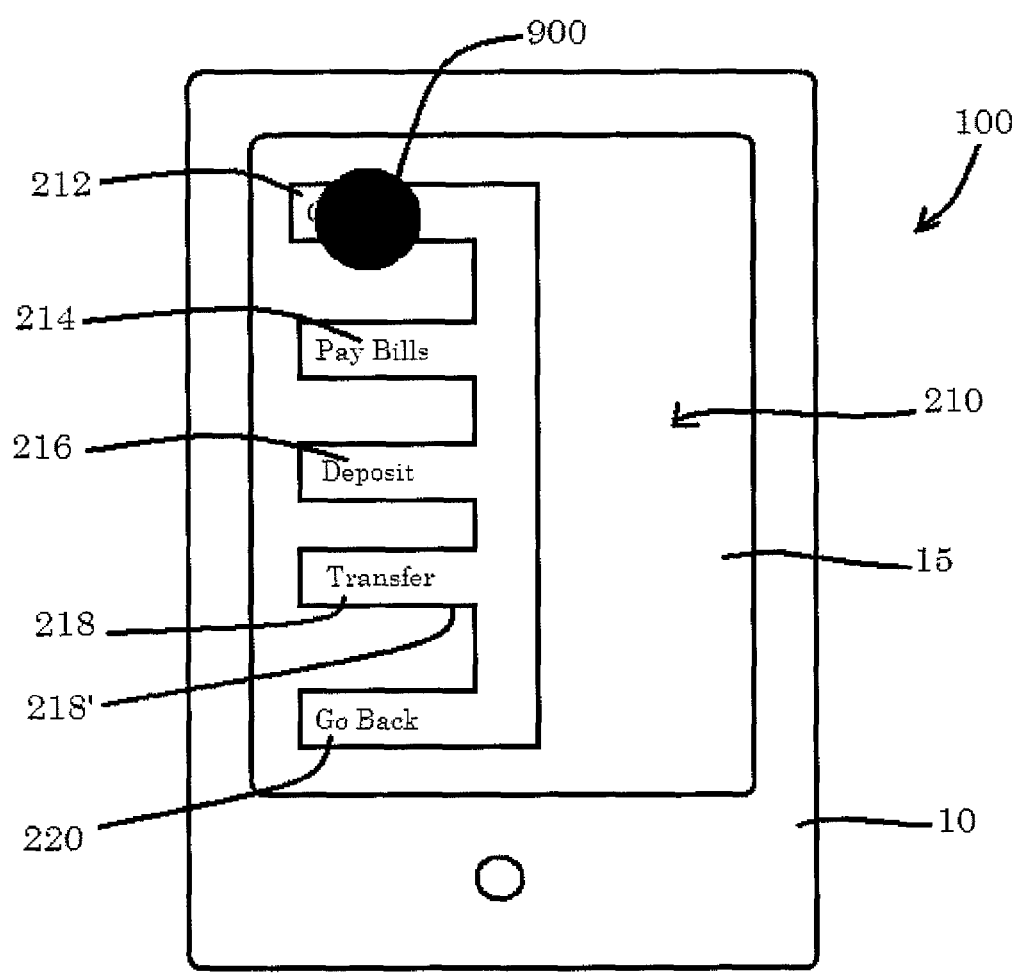

FIGS. 2A and 2B illustrate an operation wherein a user presses an object, for example, a finger or a stylus, on the touch sensitive area 15 above the region of the touch sensitive area 15 displaying the pointer 900 and moves the pointer 900 along the first selection pattern 201 to the first representation 202 by gliding the object along an area of the touch sensitive area 15 corresponding to the first selection pattern 201. In FIG. 2A 202' represents a branch of the first selection pattern 201 adjacent to the first representation 202. In example embodiments a second selection pattern 210 (as shown in FIG. 2C) may be generated by the electronic device 100 when the pointer 900 is moved over the first representation 202 or is moved away from the first representation 202 along the branch 202' adjacent to the first representation 202. As shown in FIG. 2C the second representation 210 resembles a ladder shaped tree having fifth, sixth, seventh, eighth, and ninth representations 212, 214, 216, 218, and 220. In example embodiments, the fifth, sixth, seventh, eighth, and ninth representations 212, 214, 216, 218, and 220 may represent actions the user may want to perform, such as pay bills, deposit money, or transfer funds.

Figure 2D:
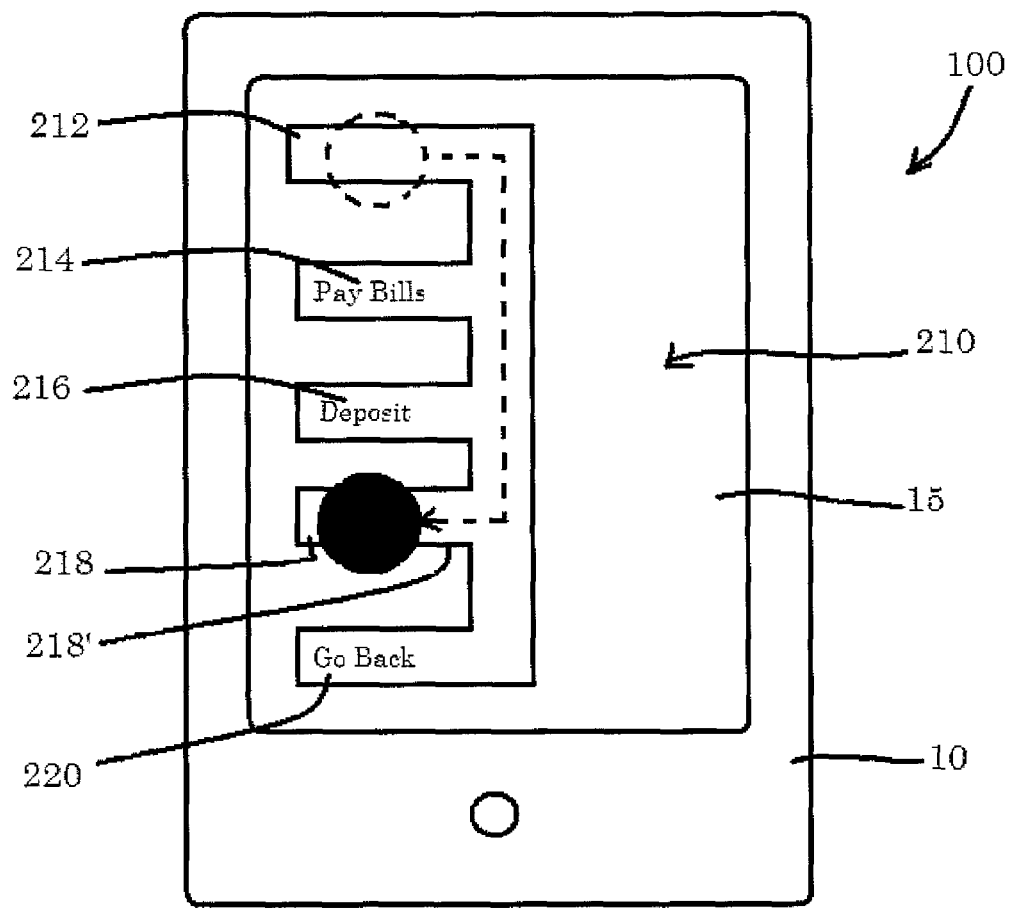
Figure 2E:
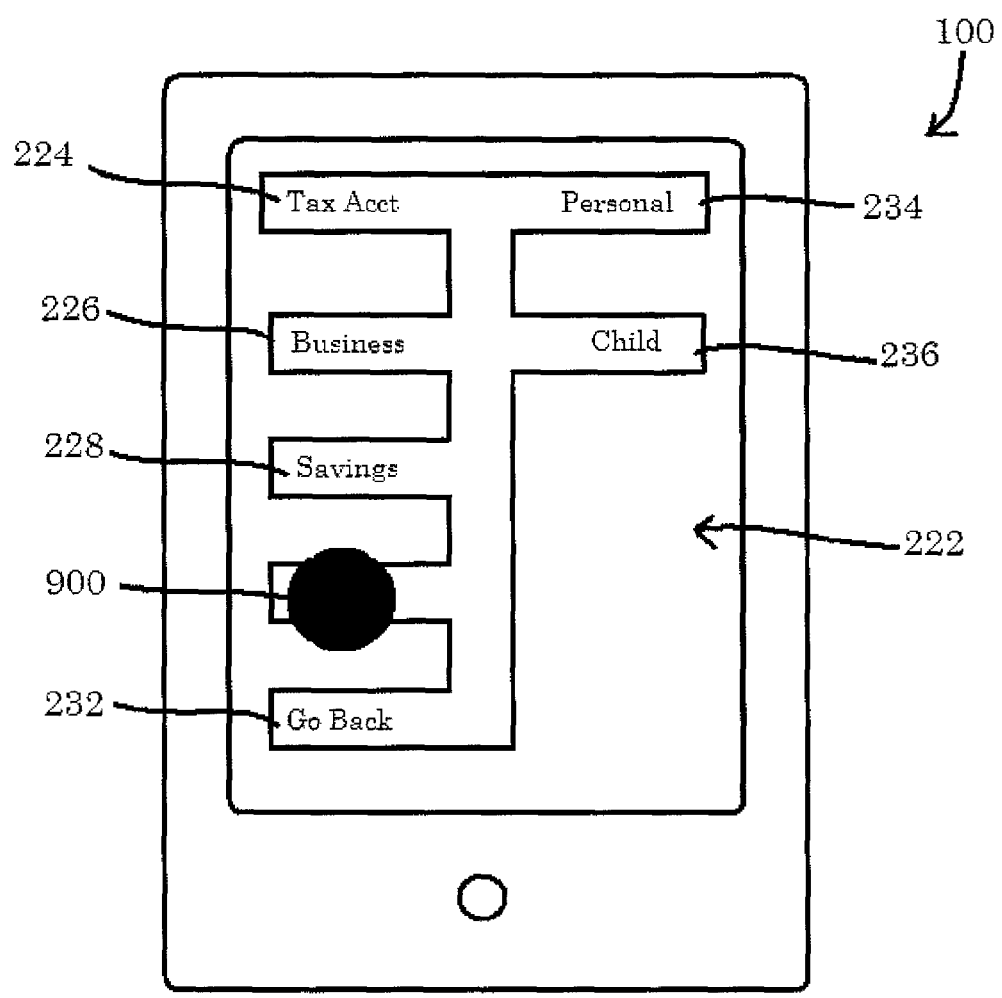
Figure 2F:
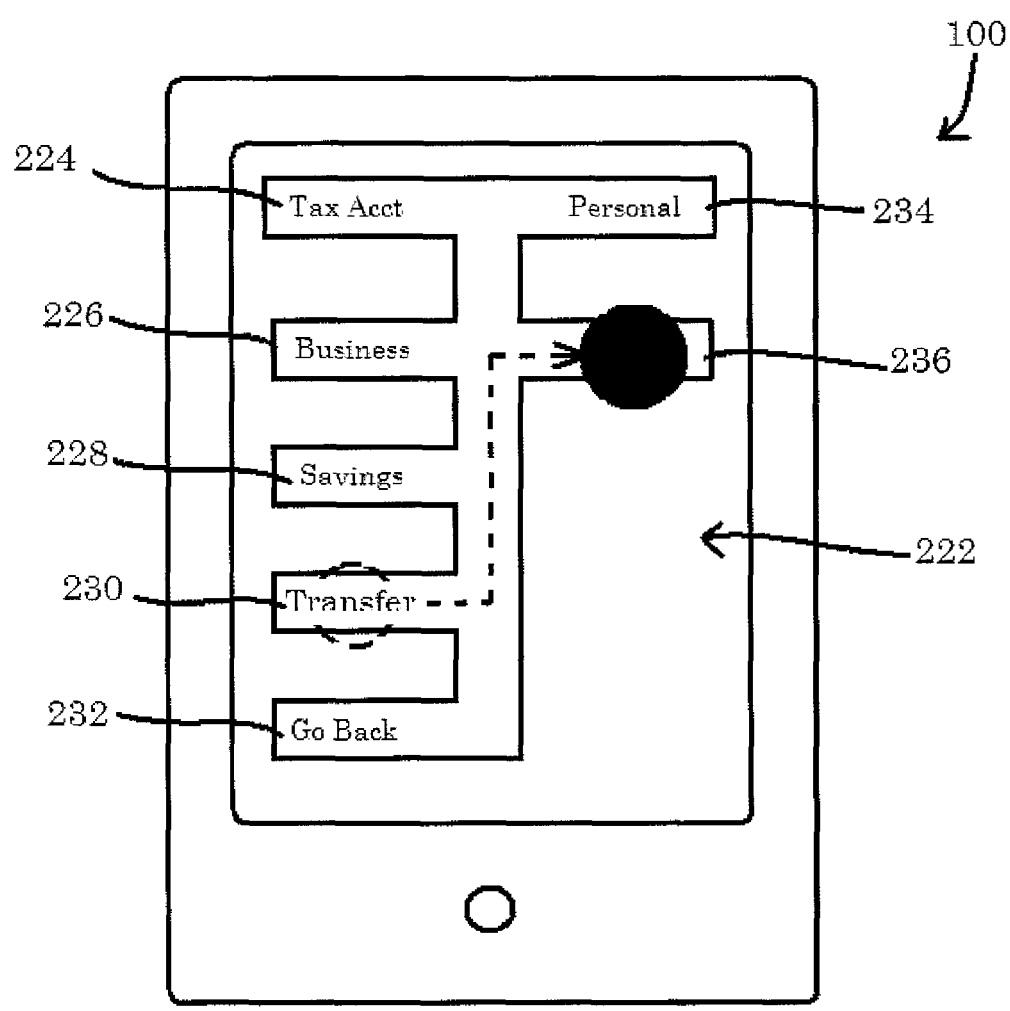

In example embodiments, the user may move the pointer 900 along the second selection pattern 210 to one of the fifth, sixth, seventh, eighth, and ninth representations 212, 214, 216, 218, and 220 to accomplish a task. As in the previous example, the user would move the pointer 900 by gliding an object, for example, a finger or a stylus, along the second selection pattern 210 to one of the branches of the second selection pattern associated with the fifth, sixth, seventh, eighth, and ninth representations 212, 214, 216, 218, and 220. For example, in the event the user wants to transfer funds from his/her checking account, the user may move the pointer 900 along the second selection pattern 210 to the eighth representation 218 as shown in FIG. 2D. In performing the above task a third selection pattern 222 may be generated as shown in FIGS. 2E and 2F. In example embodiments the third selection pattern 222 may be generated when the pointer 900 is moved over a representation or moved away from the representation along a branch of the selection pattern 222 adjacent to the representation. For example, in FIG. 2C 218' illustrates a branch of the second selection pattern 210 adjacent to the eighth representation 218.

As previously explained, the pointer 900 may be moved along the second selection pattern 210 by pressing an object, for example, a finger or a stylus, on the pointer 900 generated by the touch sensitive screen 15 and gliding the object across the touch sensitive screen 15 along the second selection pattern 210. In the event the object is moved to a region outside of the second selection pattern 210, the application may terminate. On the other hand, if the object were moved to a region outside of the second selection pattern 210, the object may simply stop moving until the object is again pressed onto the pointer 900 and then glided along the second selection pattern 210. Example embodiments, however, are not limited by the above. For example, in the event the object is moved to a region outside of the second selection pattern 210, the pointer may simply move back to its original starting point, for example back to the fifth representation 212 as shown in FIG. 2C.

FIG. 2E represents the electronic device 100 having the third selection pattern 222 displayed thereon. The third selection pattern 222 may include a tenth representation 224, an eleventh representation 226, a twelfth representation 228, a thirteenth representation 230, a fourteenth representation 232, a fifthteenth representation 234, and a sixteenth representation 236. In this particular nonlimiting example, the tenth representation 224, the eleventh representation 226, the twelfth representation 228, the thirteenth representation 230, the fourteenth representation 232, the fifthteenth representation 234, and the sixteenth representation 236 may represent targets for money transfer. For example, the money may be transferred to a tax account, a business, a savings, a personal checking account, or a child. As in the previous example, the pointer 900 may be moved by pressing an object, for example, a finger or a stylus, on a region of the touch sensitive screen 15 corresponding to the pointer 900 and gliding the object along third selection pattern 222.

In example embodiments, the pointer 900 may be moved to one of the tenth representation 224, the eleventh representation 226, the twelfth representation 228, the thirteenth representation 230, the fourteenth representation 232, the fifthteenth representation 234, and the sixteenth representation 236 by moving the pointer 900 along the third selection pattern 222. As in the previous examples, if the user were to move the pointer 900 outside of the borders defining the third selection pattern 222, the pointer may simply stop moving or may move back to its point of origin. On the other hand, the application may simply terminate. In the event the user successfully moves the pointer 900 to its target representation, a fourth selection pattern may be generated. For example, as shown in FIGS. 2E and 2F, if a user wanted to transfer money to a child, the user would simply move the pointer 900 to the sixteenth representation 236 by moving the pointer 900 along the third selection pattern 222 as described above. In example embodiments, the fourth selection pattern may be generated as the pointer 900 is moved across the sixteenth representation 236. On the other hand, the fourth selection pattern may not be generated until a user moves the pointer 900 away from the sixteenth representation 236 along a branch of the third selection pattern 222 adjacent the sixteenth representation 236.

Figure 2G:
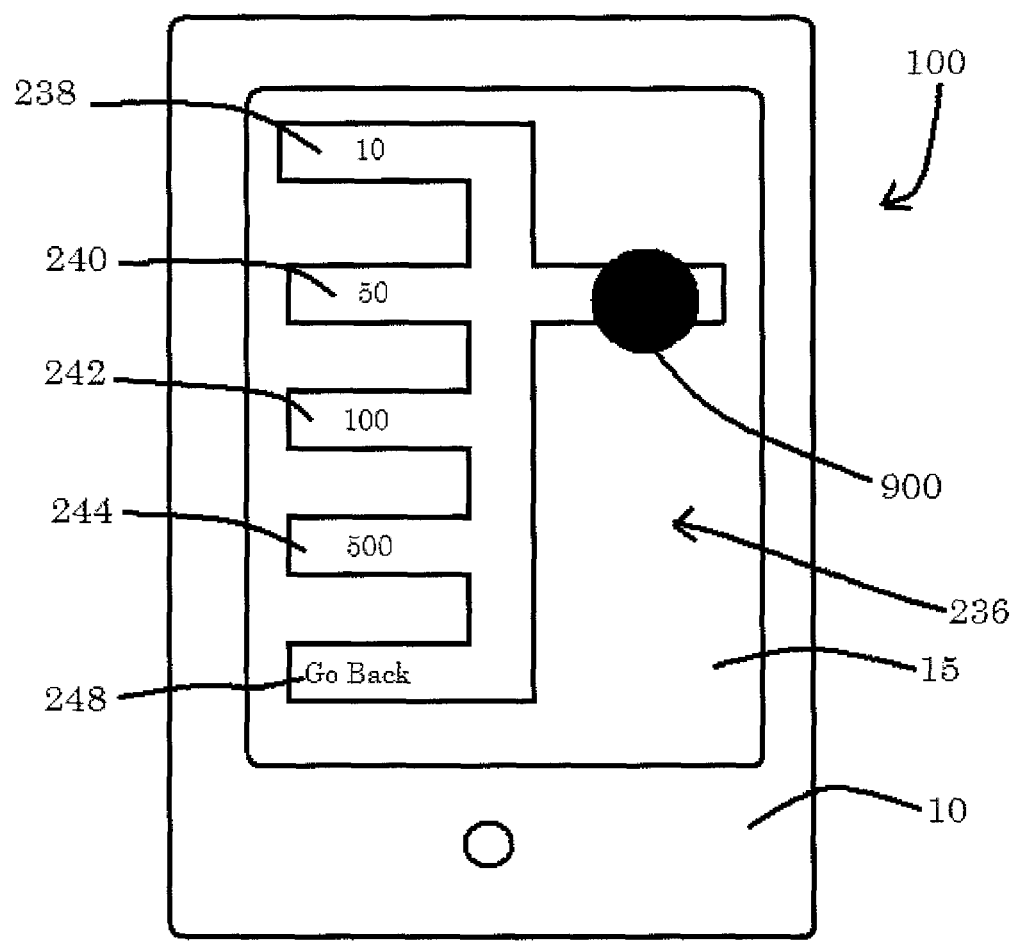
Figure 2H:
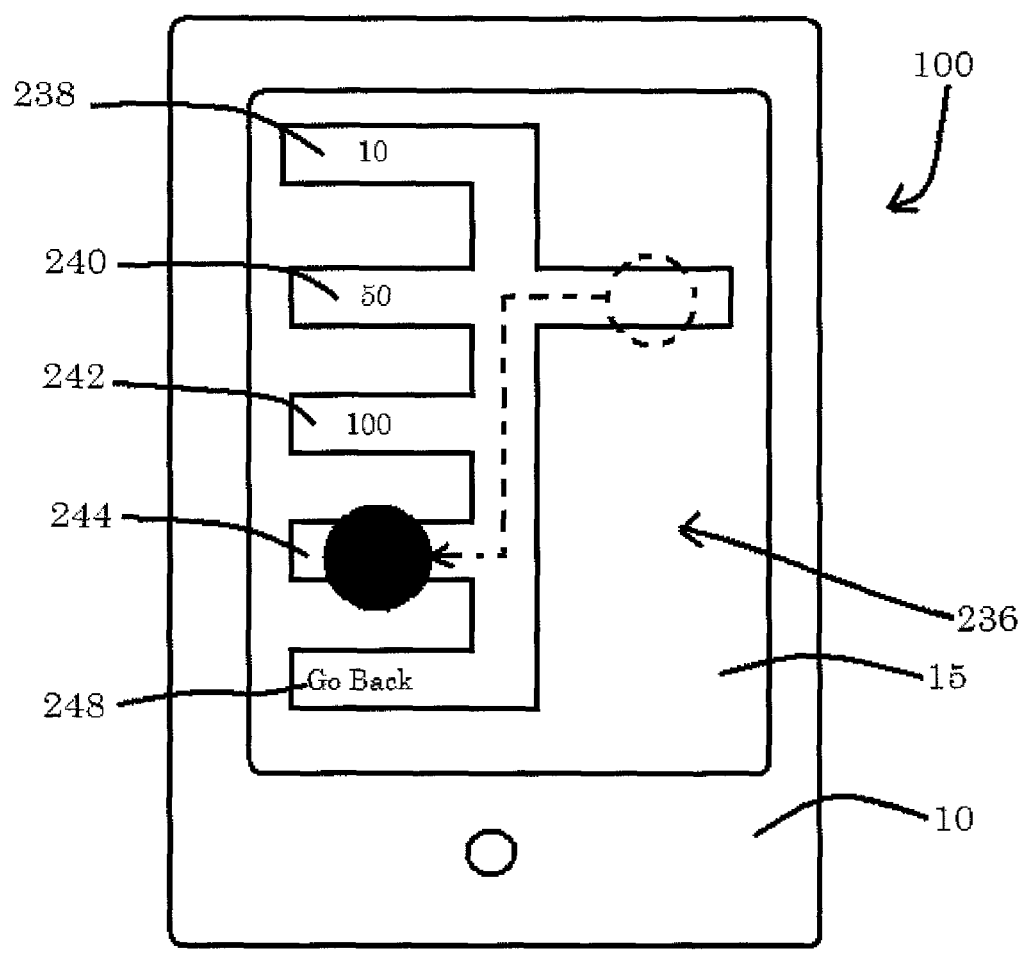

FIGS. 2G and 2H illustrate the electronic device 100 with the fourth selection pattern 236 illustrated thereon. In example embodiments, the fourth selection pattern 236 may resemble a tree with several branches thereon. The branches may each include a representation. For example, in FIG. 2G the first branch may include a seventeenth representation 238, the second branch may include an eighteenth representation 240, the third branch may include a nineteen representation 242, the fourth branch may include a twentieth representation 244, and the fifth branch may include a twenty first representation 248. In this particular nonlimiting example, seventeenth through twentieth representations 238, 240, 242, and 244 may represent various amounts of cash which may be transferred. For example, in the event the user wanted to transfer $500 to a child the user would simply move the pointer 900 along the fourth selection pattern 236 to the twentieth representation 244 in a manner consistent with that previously described and as illustrated in FIGS. 2G and 2H.

FIGS. 2A through 2G illustrate a method of transferring money. In particular, example embodiments of FIGS. 2A through 2G illustrate transferring money to a child via an electronic device 100. As shown in the figures, an electronic device 100 according to example embodiments may be configured to generate and display various selection patterns 201, 210, 222, and 236. In this nonlimiting example, a user may move a pointer 900 along the selection patterns in a gliding manner. The selection patterns 201, 210, 222, and 236 may include various representations which may be used to provoke the generation of additional selection patterns simply by moving the pointer to the representations (and in some embodiments, away from the representation). Although example embodiments thus far are aimed at generating a plurality of selection patterns 201, 210, 222, and 236 to facilitate financial transaction, example embodiments are not limited thereto.

Figure 3A:
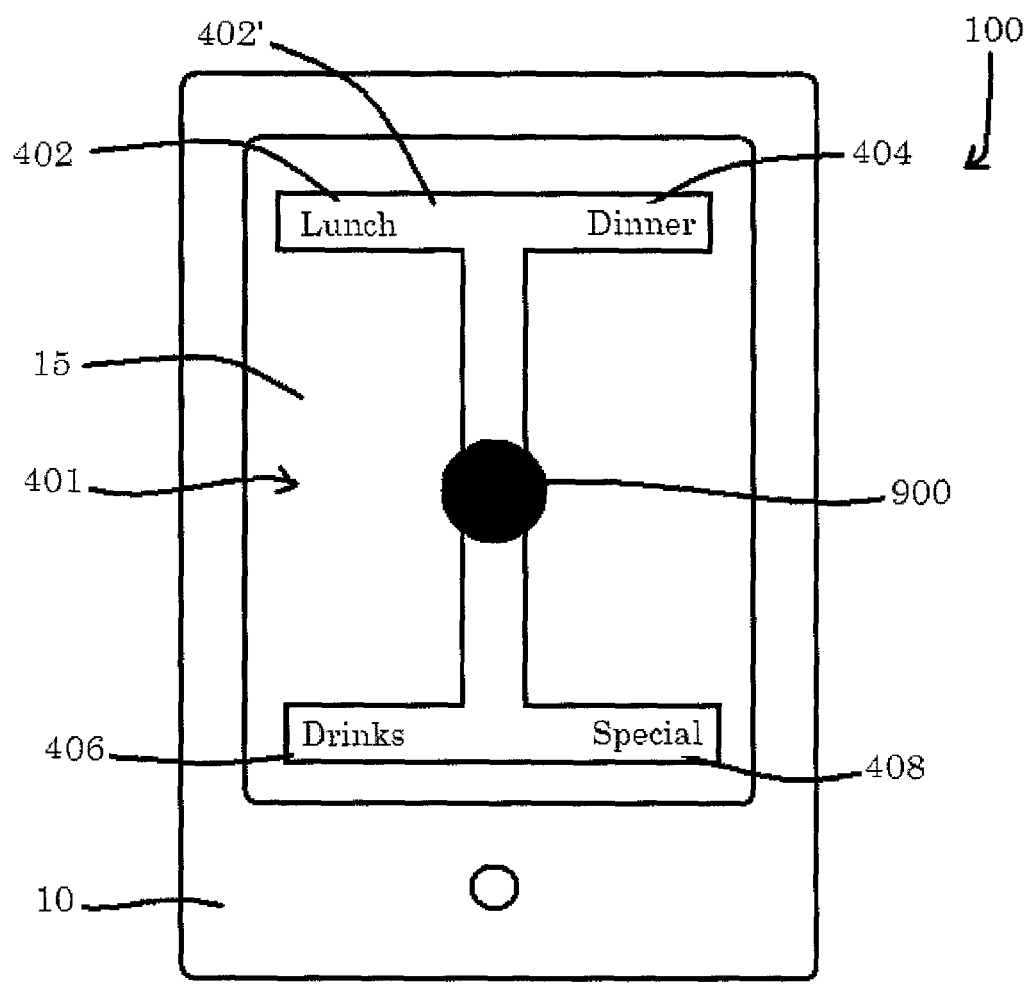
FIGS. 3A-3H illustrate an example of an electronic device having selection patterns generated thereon.

FIG. 3A provides an example of a first selection pattern 401 associated with a restaurant application. For example, if a user were to tap a region of the touch sensitive area 15 corresponding to the second image 400 of the electronic device 100, the electronic device 100 may display the first selection pattern 401 with the pointer 900 superimposed thereon. As shown in FIG. 3A, the first selection pattern 401 may resemble an "I" shaped pattern with four representations 402, 404, 406, and 408 illustrated thereon. As in the previous example, each representation may enable a second selection pattern to be generated in the event the pointer 900 is moved thereon. For example, if a user were to contact a region of the touch sensitive area 15 corresponding to the first pointer 900 with an object, for example, a finger or a stylus, and move the first pointer 900 by sliding the object along the first selection pattern 401 to the first representation "Lunch" 402, a second selection pattern with additional representations may be generated. On the other hand, if the user were to move the first pointer 900 to the second representation "Dinner" 404, a different selection pattern illustrating additional representations may be generated. As yet another example, if the user were to move the first pointer 900 to the third representation "Drinks" 406, yet a different selection pattern illustrating additional representations may be generated.

In example embodiments, a second selection pattern may be generated as soon as a user moves the pointer 900 across one of the first, second, third, and fourth representations 402, 404, 406, and 408, however example embodiments are not limited thereto. For example, the second selection pattern may be generated after the pointer 900 is moved to one of the first, second, third, and fourth representations 402, 404, 406, and 408 and then moved away from the one of the first, second, third, and fourth representations 402, 404, 406, and 408 along the branch of the selection pattern adjacent the representation. As yet another example, the second selection pattern may be generated after the pointer 900 is moved to one of the first, second, third and fourth representations 402, 404, 406, and 408 and the user taps a region of the touch sensitive area 15 corresponding to one of the first, second, third and fourth representations 402, 404, 406, and 408.

Figure 3B:
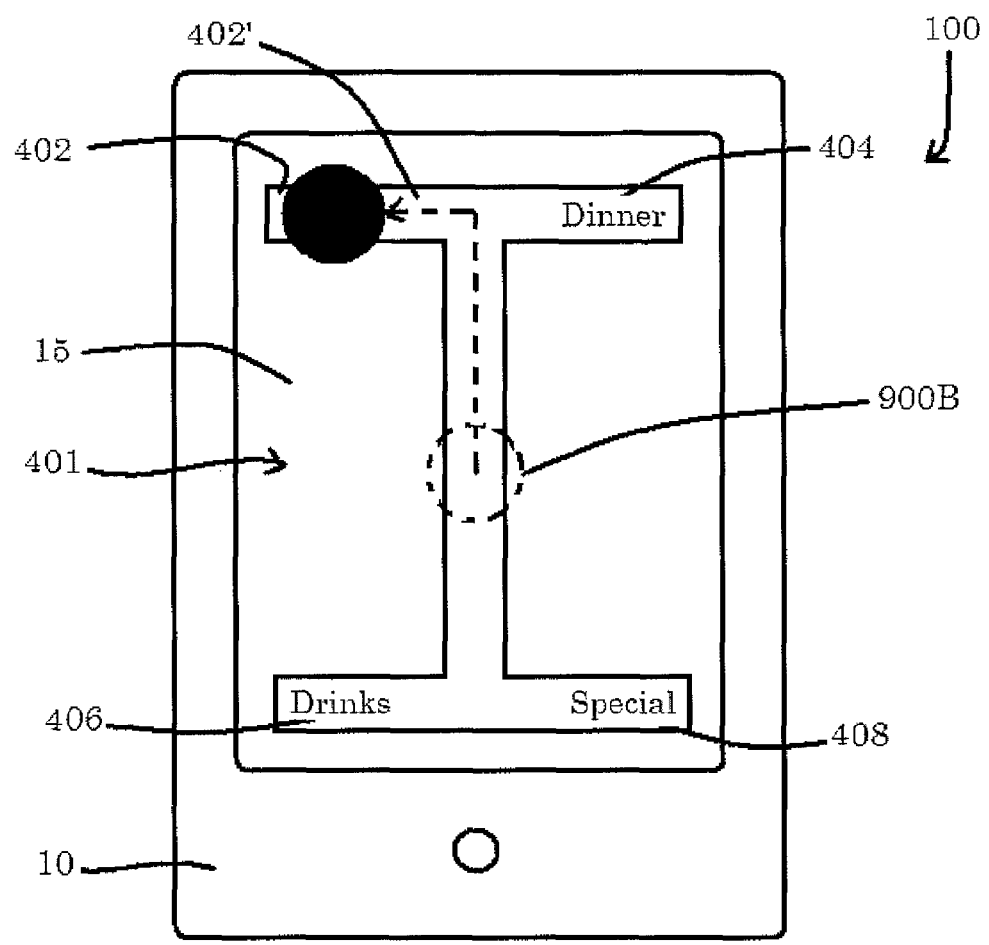

As previously explained, a user may move the pointer 900 along a selection pattern by gliding an object, for example, a finger or a stylus, across the touch sensitive area 15 and within the borders of the selection pattern. In the event the user moves the object outside of the borders forming the selection pattern, the pointer 900 may move back to its point of origination, for example, at 900B as shown in FIG. 3B. On the other hand, example embodiments also include an embodiment wherein the pointer 900 would simply stop moving if the object were to move outside of the borders forming the selection pattern 401. Similarly, if a user were to lift the object from the touch sensitive area 15 while moving the pointer 900 along a selection pattern, the pointer 900 may move back to its starting position. On the other hand, example embodiments also include an embodiment wherein the pointer 900 would simply stop moving if the object was lifted off of the touch sensitive area 15.

Figure 3C:
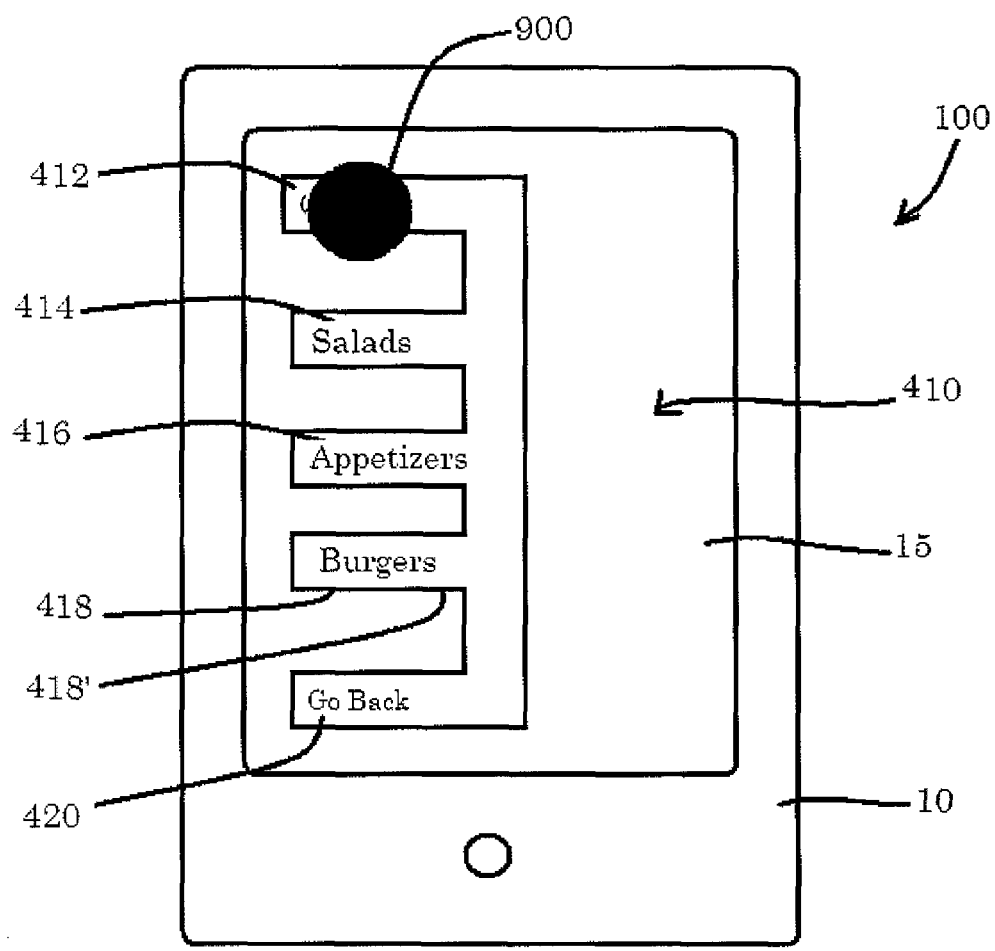
Figure 3D:
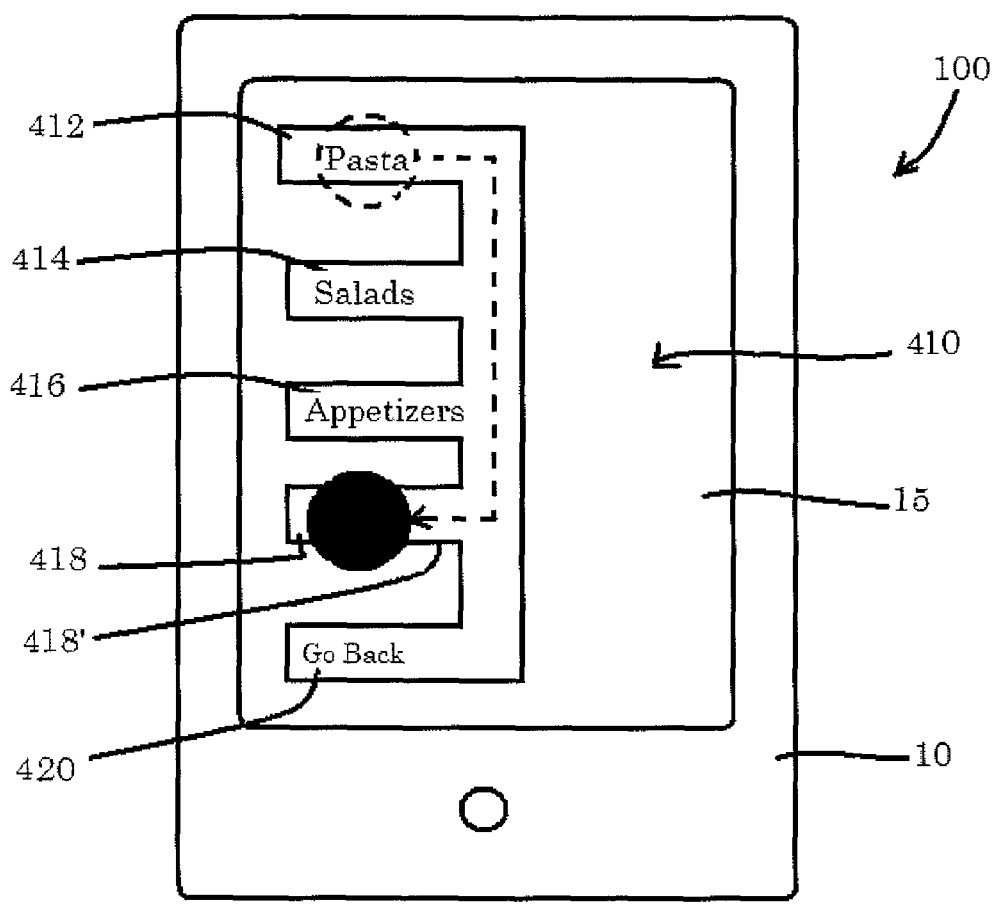

FIGS. 3A and 3B illustrate an operation wherein a user presses an object, for example, a finger or a stylus, on the touch sensitive area 15 above the region of the touch sensitive area 15 displaying the pointer 900 and moves the pointer 900 along the first selection pattern 401 to the first representation 402 by gliding the object along an area of the touch sensitive area 15 corresponding to the first selection pattern 401. In FIG. 2A 402' represents a branch of the first selection pattern 401 adjacent to the first representation 402. In example embodiments a second selection pattern 410 (as shown in FIG. 3C) may be generated by the electronic device 100 when the pointer 900 is moved over the first representation 402 or is moved away from the first representation 402 along the branch 402' adjacent to the first representation 402. As shown in FIG. 3C the second selection pattern 410 resembles a ladder shaped tree having fifth, sixth, seventh, eighth, and ninth representations 412, 414, 416, 418, and 420. In example embodiments, the fifth, sixth, seventh, eighth, and ninth representations 412, 414, 416, 418, and 420 may represent menu options a customer may want to select, such as Pasta, Salads, Appetizers, and Burgers.

In example embodiments, the user may move the pointer 900 along the second selection pattern 410 to one of the fifth, sixth, seventh, eighth, and ninth representations 412, 414, 416, 418, and 420 to generate another selection pattern which may further define the menu option selected by a customer. As in the previous example, the user would move the pointer 900 by gliding an object, for example, a finger or a stylus, along the second selection pattern 410 to one of the branches of the second selection pattern 410 associated with the fifth, sixth, seventh, eighth, and ninth representations 412, 414, 416, 418, and 420. For example, in the event a customer would like to order a burger, a waiter (an example of a user) may move the pointer 900 along the second selection pattern 410 to the eighth representation 418. In performing the above task a third selection pattern 422 may be generated as shown in FIGS. 2E and 2F. In example embodiments the third selection pattern 422 may be generated when the pointer 900 is moved over a representation or moved away from the representation along a branch of the selection pattern 422 adjacent to the representation. For example, in FIG. 3C 418' illustrates a branch of the second selection pattern 410 adjacent to the eighth representation 418.

As previously explained, the pointer 900 may be moved along the second selection pattern 410 by pressing an object, for example, a finger or a stylus, on the pointer 900 and gliding the object across the touch sensitive area 15 along the second selection pattern 410. In the event the object is moved to a region of the touch sensitive area 15 outside of the second selection pattern 410, the application may terminate. On the other hand, if the object were moved to a region outside of the second selection pattern 410, the object may simply stop moving until the object is again pressed onto the pointer 900 and then glided along the second selection pattern 410. Example embodiments, however, are not limited by the above. For example, in the event the object is moved to a region outside of the second selection pattern 410, the pointer may simply move back to its original starting point, for example back to the fifth representation 412 as shown in FIG. 3C.

Figure 3E:
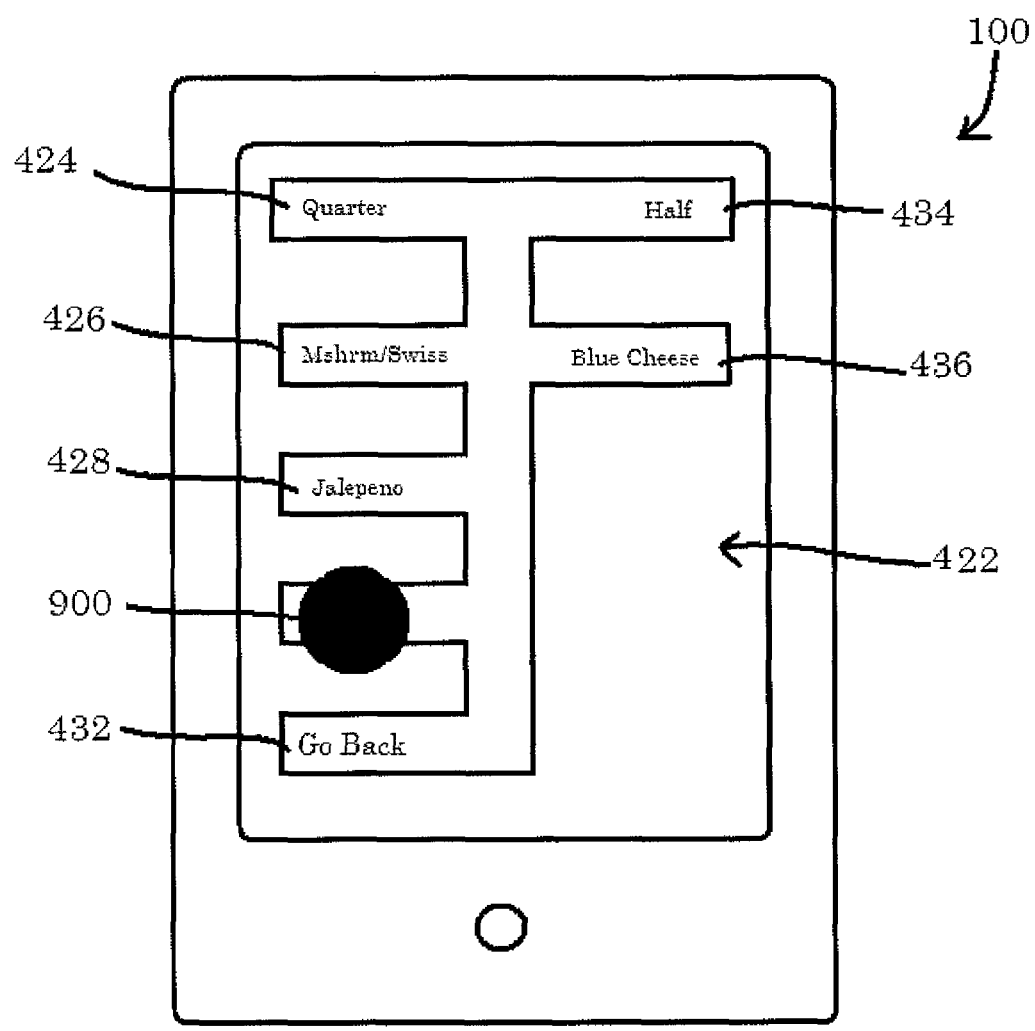

FIG. 3E represents the electronic device 100 having the third selection pattern 422 displayed thereon. The third selection pattern 422 may include a tenth representation 424, an eleventh representation 426, a twelfth representation 428, a thirteenth representation 430, a fourteenth representation 432, a fifthteenth representation 434, and a sixteenth representation 436. In this particular nonlimiting example, the tenth representation 424, the eleventh representation 426, the twelfth representation 428, the thirteenth representation 430, the fourteenth representation 432, the fifthteenth representation 434, and the sixteenth representation 436 may represent a type of burger a customer may desire. For example, the burger may be one of a quarter pound burger, a mushroom swiss burger, a jalepeno burger, a half pound burger, of a blue cheese burger. As in the previous example, the pointer 900 may be moved by pressing an object, for example, a finger or a stylus, on a region of the touch sensitive screen 15 corresponding to the pointer 900 and gliding the object along third selection pattern 422.

Figure 3F:
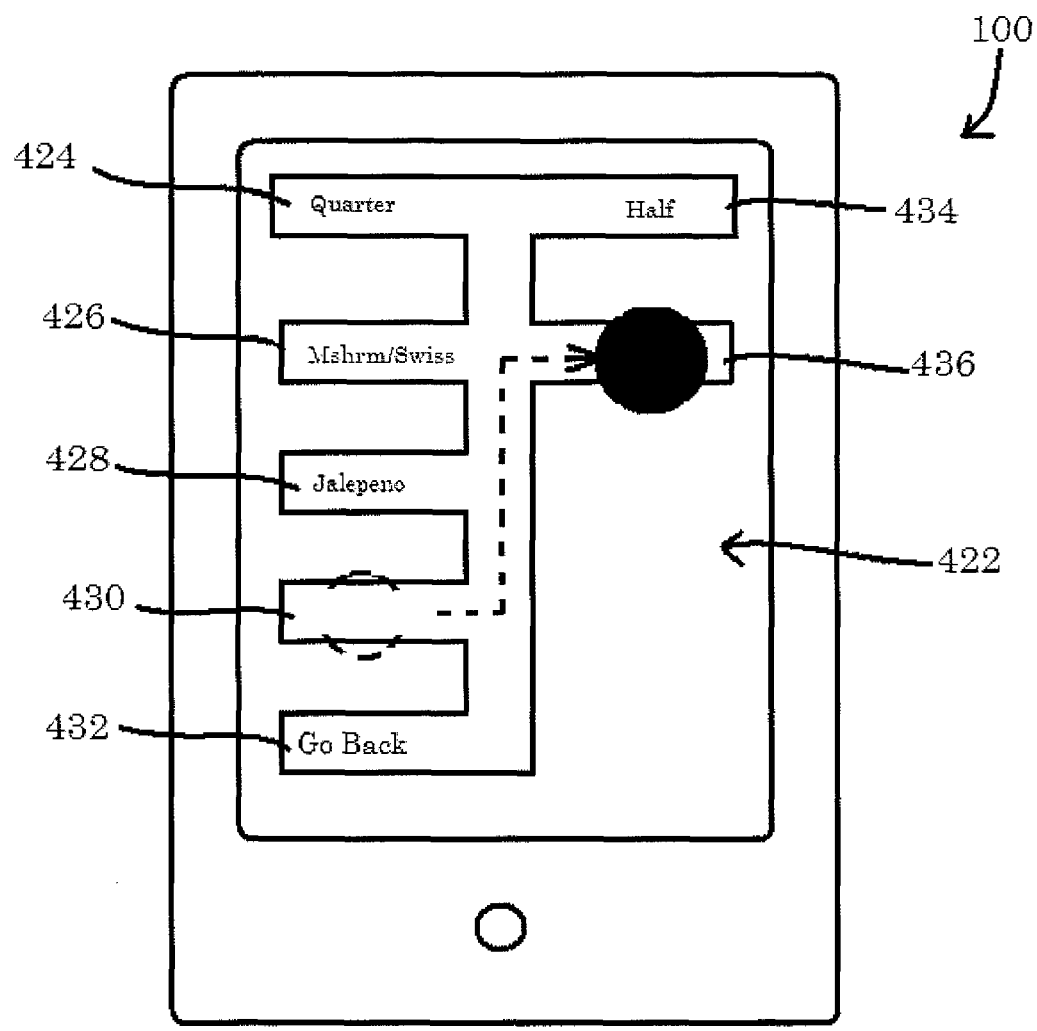

In example embodiments, the pointer 900 may be moved to one of the tenth representation 424, the eleventh representation 426, the twelfth representation 428, the thirteenth representation 430, the fourteenth representation 432, the fifthteenth representation 434, and the sixteenth representation 436 by moving the pointer 900 along the third selection pattern 422. As in the previous examples, if the user were to move the object outside of the borders defining the third selection pattern 422, the pointer may simply stop moving or may move back to its point of origin. On the other hand, the application may simply terminate. In the event the user successfully moves the pointer 900 to its target representation, a fourth selection pattern may be generated. For example, as shown in FIGS. 3E and 3F, if a customer wanted to order a blue cheese burger the waiter (an example of a user) may simply move the pointer 900 to the sixteenth representation 436 by moving the pointer 900 along the third selection pattern 422 as described above. In example embodiments, the fourth selection pattern may be generated as the pointer 900 is moved across the sixteenth representation 436. On the other hand, the fourth selection pattern may not be generated until a user moves the pointer 900 away from the sixteenth representation 436 along a branch of the third selection pattern 422 adjacent the sixteenth representation 436.

Figure 3G:
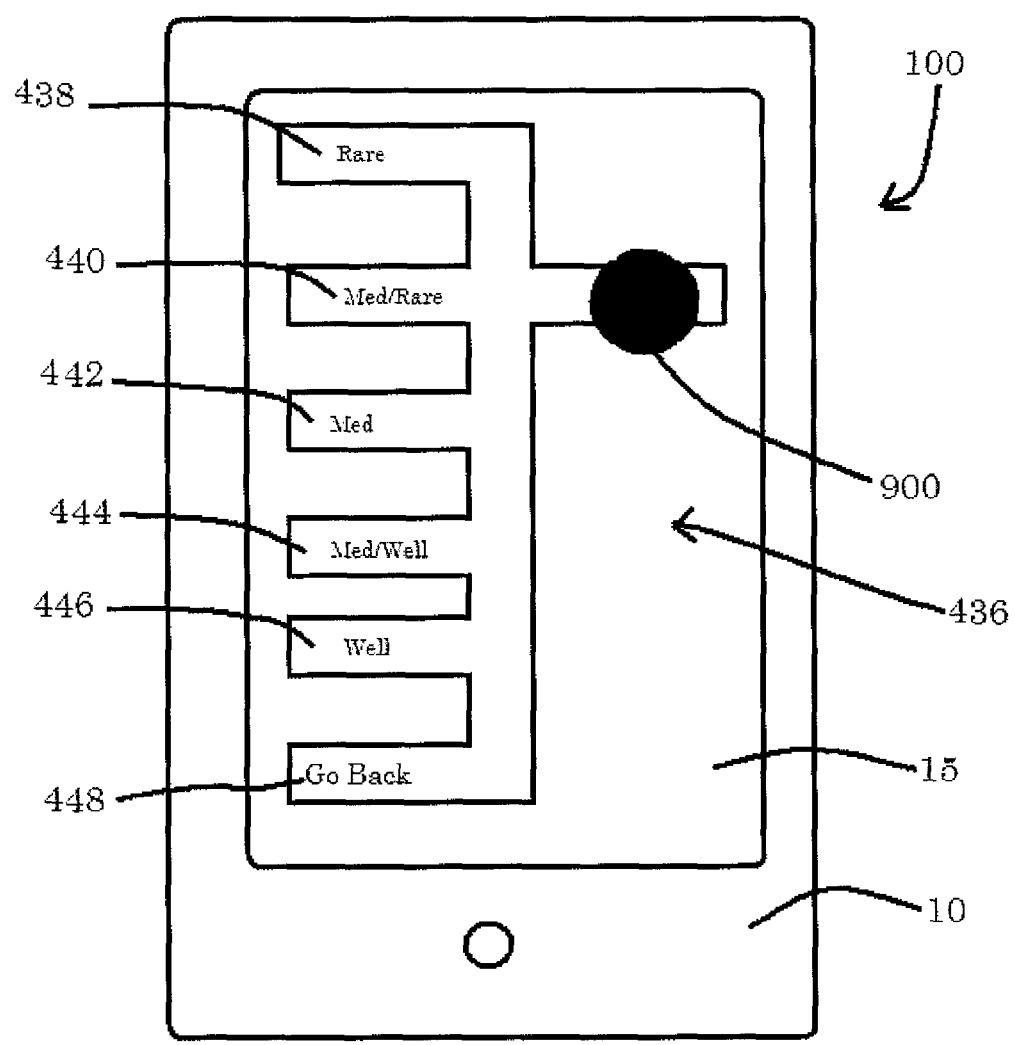
Figure 3H:
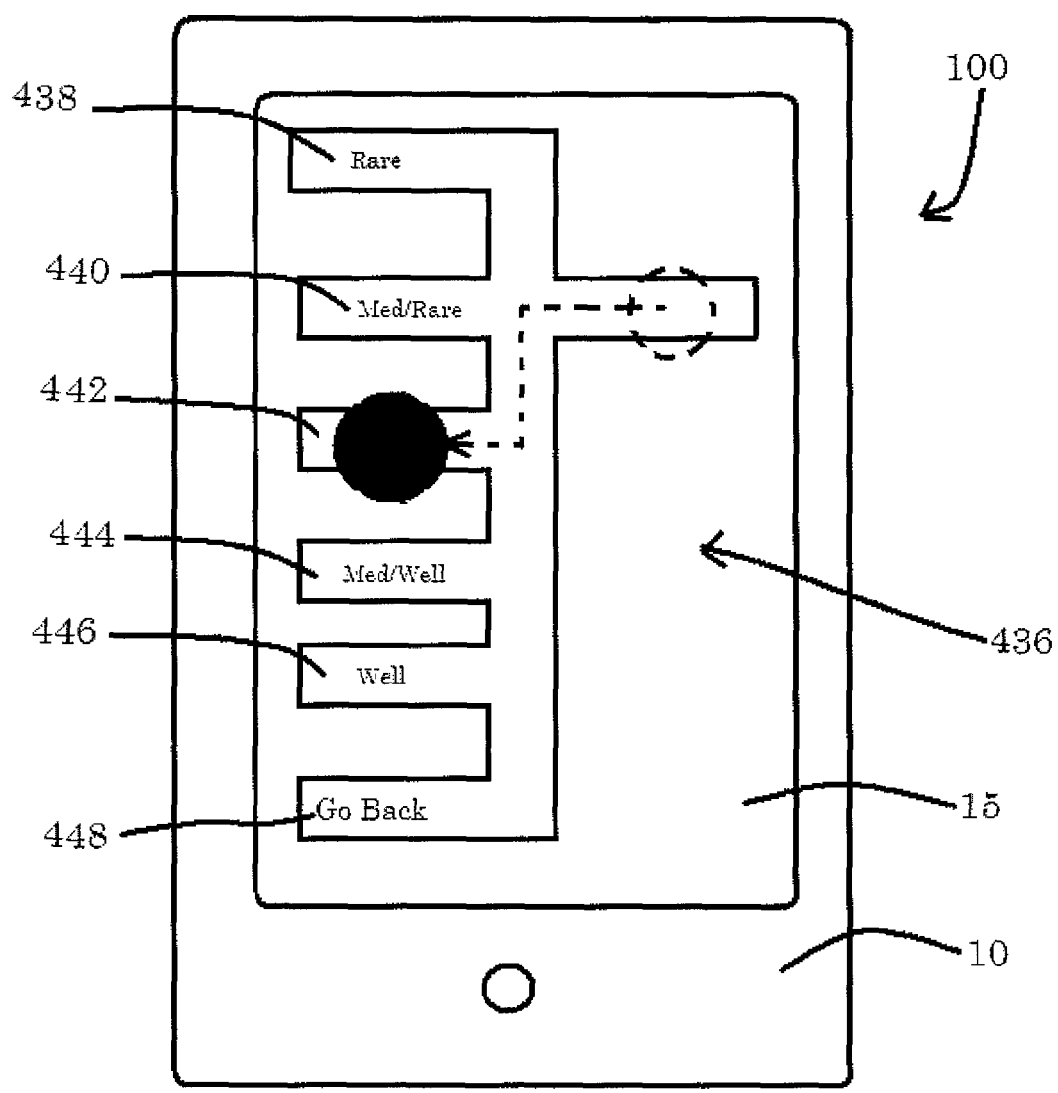

FIGS. 3G and 3H illustrate the electronic device 100 with the fourth selection pattern 436 illustrated thereon. In example embodiments, the fourth selection pattern 436 may resemble a tree with several branches thereon. The branches may each include a representation. For example, in FIG. 3G the first branch may include a seventeenth representation 438, the second branch may include an eighteenth representation 440, the third branch may include a nineteen representation 442, the fourth branch may include a twentieth representation 444, the fifth branch may include a twenty first representation 444, and the sixth branch may include a twenty second representation 448. In this particular nonlimiting example, seventeenth through twenty first representations 438, 440, 442, 444, and 446 may represent options pertaining to the degree to which a burger is cooked. For example, in the event a customer wanted to order a burger cooked to "medium", the waiter would simply move the pointer 900 along the fourth selection pattern 436 to the nineteenth representation 442 in a manner consistent with that previously described and as illustrated in FIGS. 3A and 3H.

Example embodiments also include features that are not shown in the figures. For example, in example embodiments, various portions of the selection patterns may be tapped to generate additional and/or alternative selection patterns. For example, in a menu application French fries may be considered a "default" side order to a hamburger. However, in the event a customer would prefer a different side order, for example, a salad, the user may simply "tap" the branch of the selection pattern 410 corresponding to "Burger" representation to provoke an additional or alternate selection pattern allowing the user to record what type of salad is requested and the salad dressing that may accompany the salad.

FIGS. 3A through 3G illustrate a method of taking an order. In particular, example embodiments of FIGS. 3A through 3G illustrate ordering a half pound burger cooked to medium using an electronic device 100. As shown in the figures, an electronic device 100 according to example embodiments may be configured to generate and display various selection patterns 401, 410, 422, and 436. In this nonlimiting example, a user may move a pointer 900 along the selection patterns in a gliding manner. The selection patterns 401, 410, 422, and 436 may include various representations which may be used to generate additional selection patterns simply by moving the pointer to the representations (and in some embodiments, away from the representation). Although example embodiments thus far are aimed at generating a plurality of selection patterns 201, 210, 222, 236, 401, 410, 422, and 436 to facilitate financial transactions or food orders, example embodiments are not limited thereto.

Figure 4A:
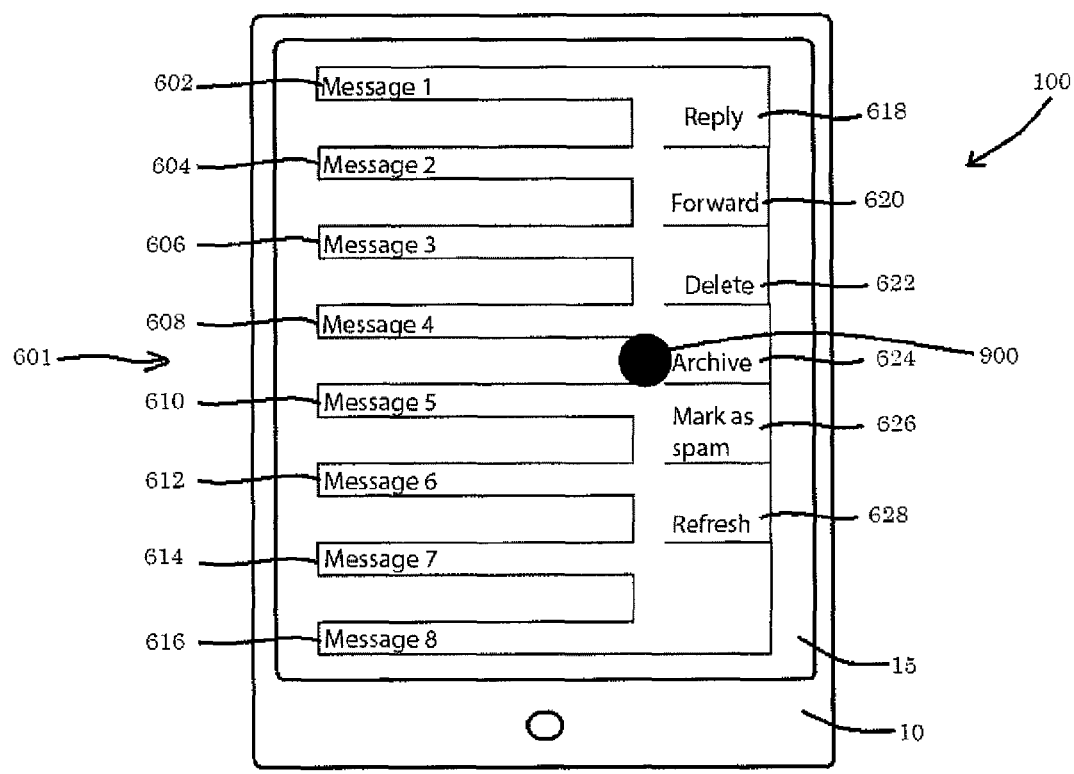
FIGS. 4A-4E illustrate an example of an electronic device having selection patterns generated thereon.

FIG. 4A provides an example of a first selection pattern 601 associated with a messaging application, for example, the messaging application 600 illustrated in FIG. 1. In example embodiments, the messaging application may be launched by simply tapping on a region of the touch sensitive area 15 corresponding to the messaging icon 600. When the messaging icon 600 is tapped, the first selection pattern 601 may be generated by the electronic device 100 and displayed on the touch sensitive area 15 of the electronic device 100.

In example embodiments, the first selection pattern 601 may resemble a ladder having several rungs with representations illustrated thereon. In example embodiments, the representations may be associated with various messages. For example, as shown in FIG. 4A, the first selection pattern 601 is illustrated as having eight different rungs associated with eight different messages. The first rung may include a first representation 602 representing a first message, the second rung may include a second representation 604 representing a second message, the third rung may include a third representation 606 representing a third message, the fourth rung may include a fourth representation 608 representing a fourth message, the fifth rung may include a fifth representation 610 representing a fifth message, the sixth rung may include a sixth representation 612 representing a sixth message, the seventh rung may include a seventh representation 614 representing a seventh message, and the eighth rung may include an eighth representation 616 representing an eighth message. Although FIG. 4A illustrates a ladder shaped selection pattern 601 having eight rungs and eight representations, example embodiments are not limited thereto. For example, the first selection pattern 601 may include more or less than eight rungs representing more or less than eight messages. Furthermore, each rung is not required to have a representation. In addition, although FIG. 4A illustrates the representations 602, 604, 606, 608, 610, 614, and 616 as being comprised of text, example embodiments are not limited thereto. For example, the representations may be comprised of images.

In example embodiments, the first selection pattern 601, in addition to having rung like members, may also include a body with additional representations. The additional representations may be configured to allow a user to perform an action on the representations illustrated on rungs. For example, the additional representations may include a reply representation 618, a forward representation 620, a delete representation 622, an archive representation 624, a "Mark as spam" 626 representation, and a refresh representation 628. Although example embodiments illustrate the first selection pattern as including six additional representations 618, 620, 622, 624, 626, and 628, example embodiments are not limited thereto as there may be more or less than six additional representations. Furthermore, the additional representations 618, 620, 622, 624, 626, and 628 are for purposes of illustration only and are not meant to limit example embodiments.

In example embodiments, the reply representation 618 may allow a user to reply to a message in a messaging system. In example embodiments the forward representation 620 may allow a user to forward a message to another party, the delete representation 622 may allow a user to delete a message stored in a messaging system, the archive representation 624 may allow a user to save a message of a messaging system, the "Mark as spam" representation 626 may allow a user to mark a message as spam, and the Refresh representation 628 may allow a user to refresh the touch sensitive area 15 of the electronic device 100. Although the additional representations 618, 620, 622, 624, 626, and 628 are illustrated as being comprised of text, example embodiments are not limited thereto. For example, the additional representations 618, 620, 622, 624, 626, and 628 may be comprised of images, symbols, and/or pictures in addition to, or in lieu of, text. Furthermore, the six additional representations 618, 620, 622, 624, 626, and 628 are merely exemplary as there may be more or less than six additional representations or functions which are different from those described above.

Figure 4B:
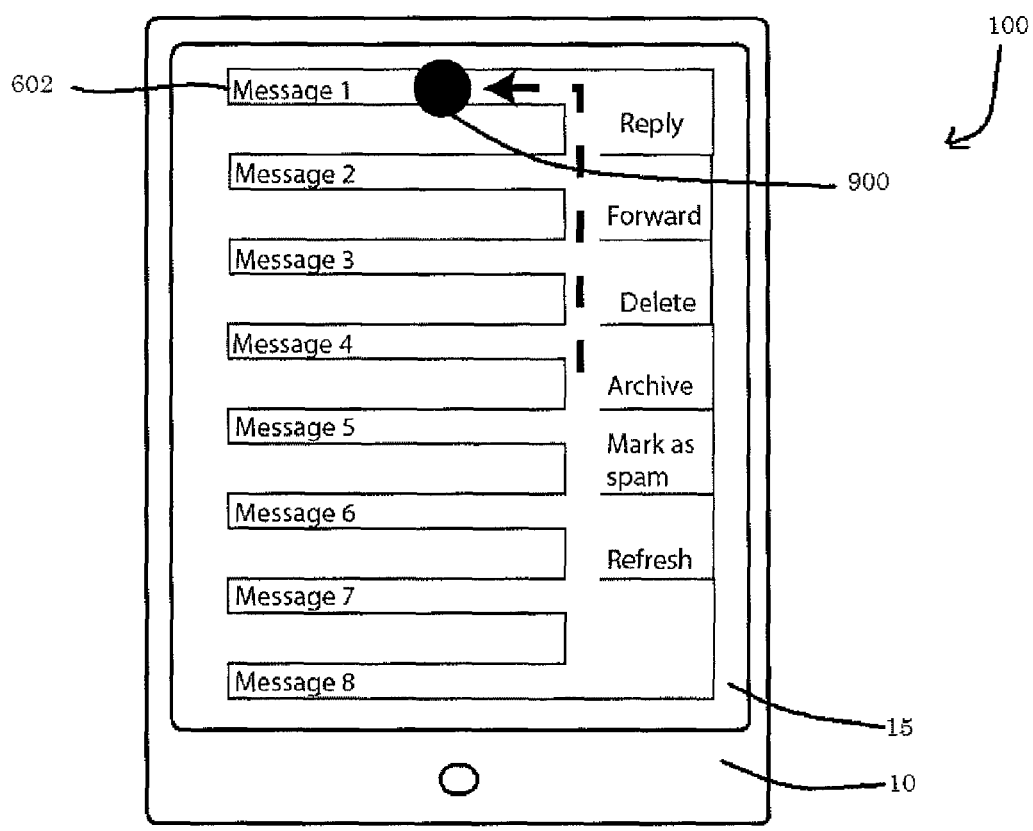

Referring again to FIGS. 1 and 4A, if a user were to activate the messaging icon 600 as illustrated in FIG. 1, the electronic device 100 may generate a first selection pattern 601 as shown in FIG. 4A with a pointer 900 superimposed thereon. As in the previous nonlimiting examples, a user may move the pointer 900 by pressing an object, such as a finger or stylus, on the touch sensitive area 15 of the electronic device 100. The user may then move the pointer 900 by gliding the object on the touch sensitive area 15 and along the first selection pattern 601 to one of the first through eighth representations 602, 604, 606, 608, 610, 612, 614, and 616. For example, as illustrated in FIGS. 4A and 4B a user may move the pointer 900 along the first selection pattern 601 to the first representation 602 to review a first message "Message 1." As in the previous nonlimiting examples, if a user were to lift the object off of the touch sensitive area 15 prior to completing the movement of the pointer 900 to the first representation 602, the pointer 900 may stop moving or may return back to its point of origin.

Figure 4C:
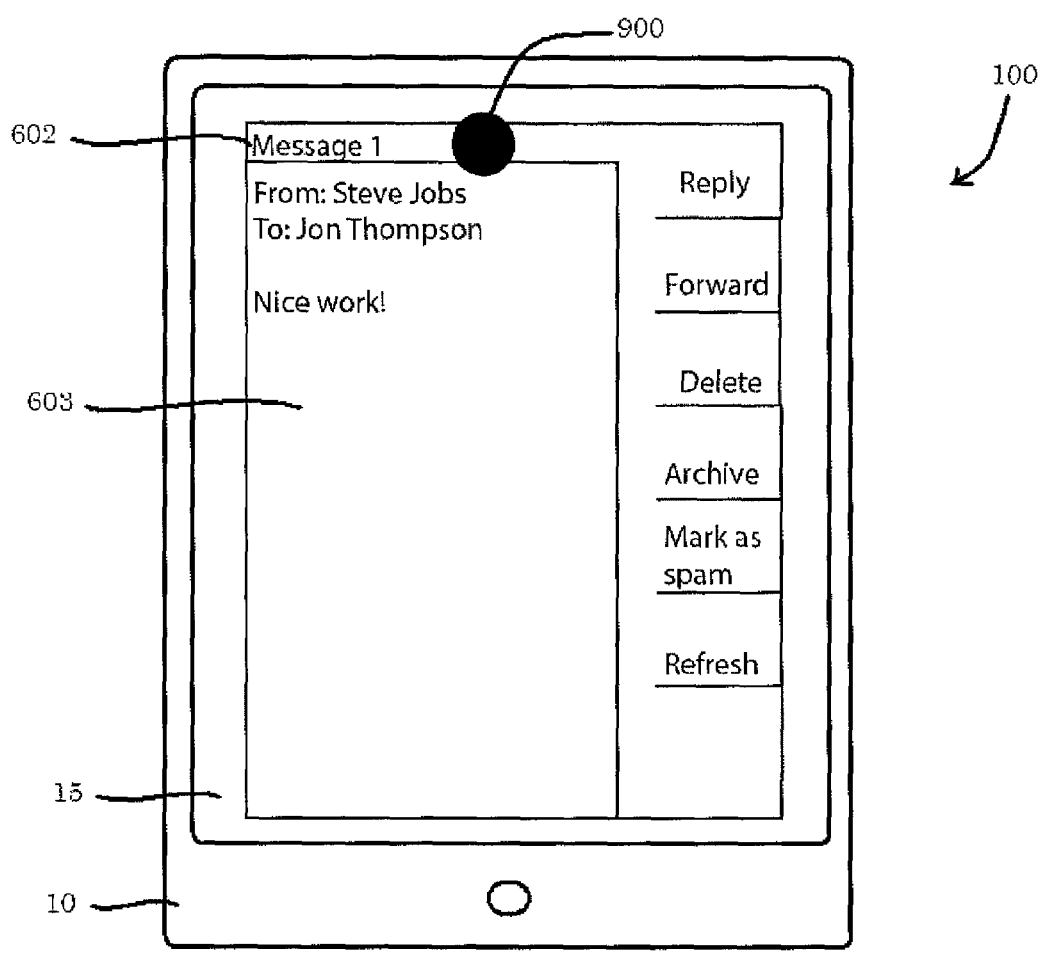

In example embodiments, if a user were to successfully move the pointer 900 from its point of origin to one of the first, second, third, fourth, fifth, sixth, seventh, and eighth representations 602, 604, 606, 608, 610, 612, and 616 to review one of the first message, the second message, the third message, the fourth message, the fifth message, the sixth message, the seventh message, and the eighth message, a window displaying the one of the first message, the second message, the third message, the fourth message, the fifth message, the sixth message, the seventh message, and the eighth message may be displayed. For example, as shown in FIG. 4C, if a user were to move the pointer 900 to the first representation 602 to review a first message, a window 603 displaying the message "Nice Work" from a sender (for example, Steve Jobs) to a receiver (for example, Jon Thompson) may be displayed. In addition, a second selection pattern 605 may also be generated. Example embodiments, however, are not limited to the instant example. For example, in addition to a sender and receiver name, a time the message was sent or received may be displayed. Furthermore, the display may not include certain data such as a recipient of a message.

Figure 4D:
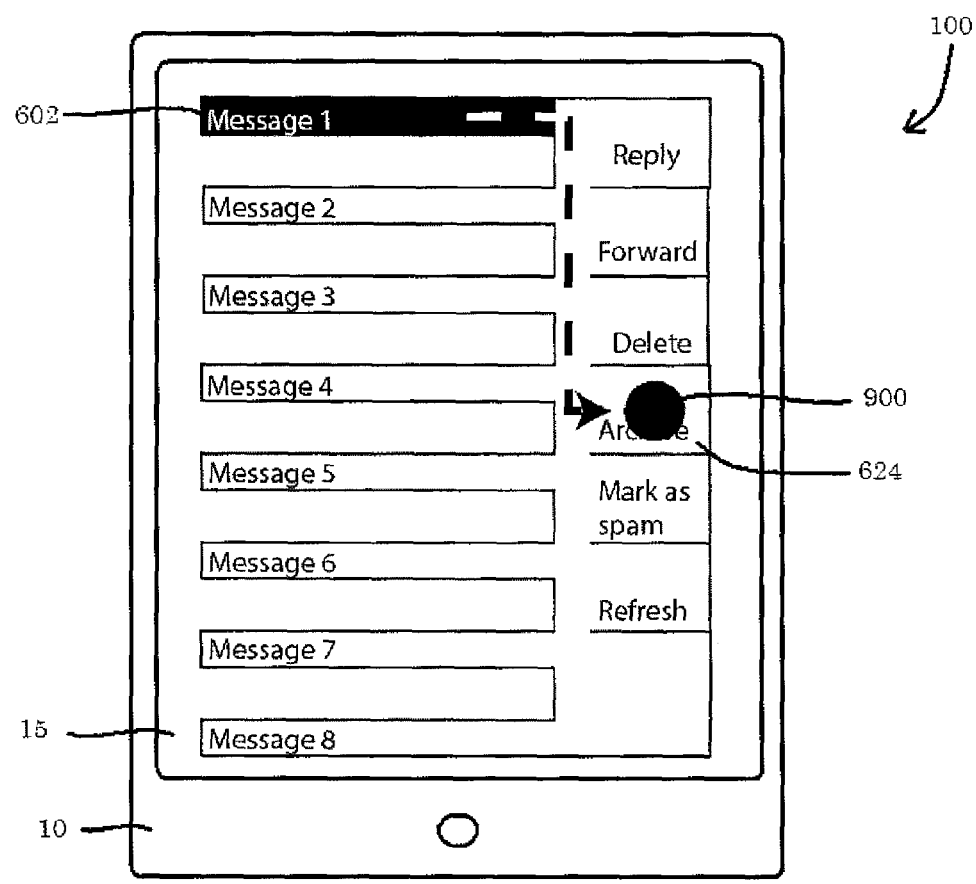
Figure 4E:
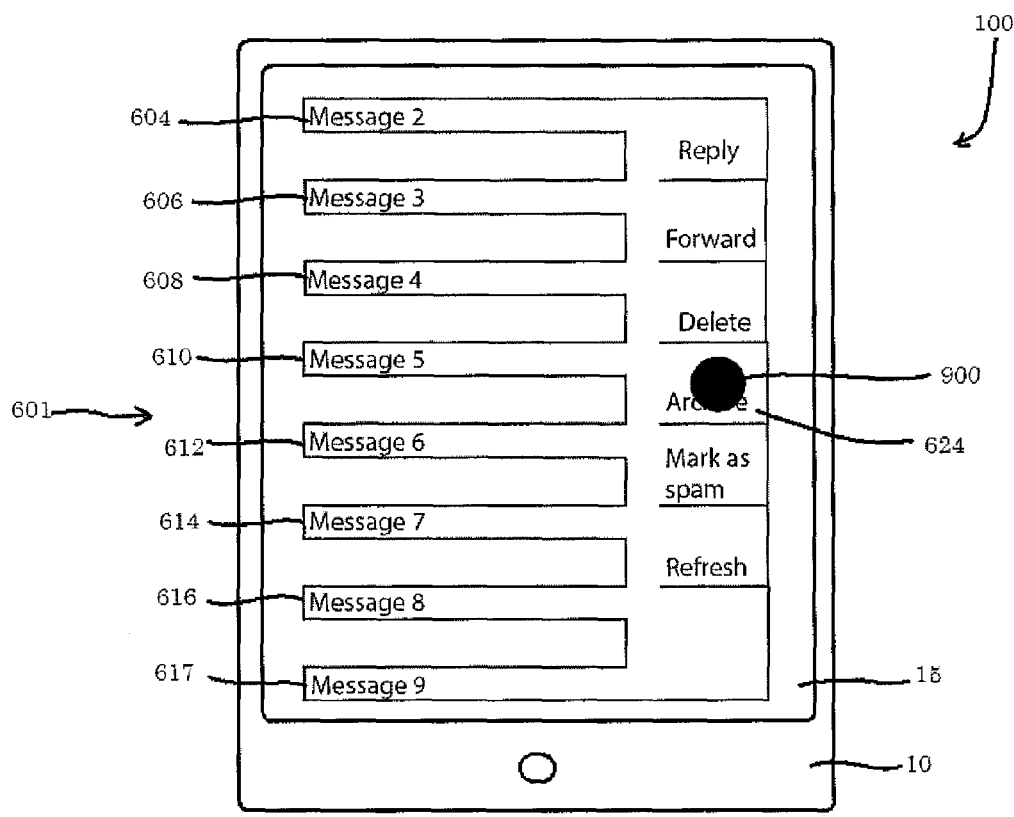

In example embodiments, after the first message is reviewed, the user may move the pointer 900 along the second selection pattern 605 to one of the additional representations 618, 620, 622, 624, 626, and 628. In example embodiments, the pointer 900 may be moved by sliding the object across the screen, and within the boundaries of the second selection pattern 605 to arrive at one of the first, second, third, fourth, fifth, and sixth additional representations 618, 620, 622, 624, 626, and 628. For example, if a user wanted to archive the first message, the user would touch the touch sensitive screen 15 with an object, for example, a finger or a stylus, above the displayed pointer 900 and then move the pointer 900 by sliding the object on the touch sensitive screen 15 within the borders defined by the second selection pattern 605 as shown in FIGS. 4C and 4D to the fourth additional representation 900. At this point, the first representation 602 may be deleted from the first selection pattern 601 to form a third selection pattern 607 as shown in FIG. 4E.

FIGS. 2A through 2G illustrate a method of banking in accordance with example embodiments. FIGS. 3A through 3G illustrate a method of taking an order in accordance with example embodiments. FIGS. 4A-4E illustrate a method of managing messages in accordance with example embodiments. The methods illustrated in FIGS. 2A through 2G, 3A through 3G, and 4A through 4E are not meant to limit the invention, but are merely used to describes examples of the invention.

Figure 5A:
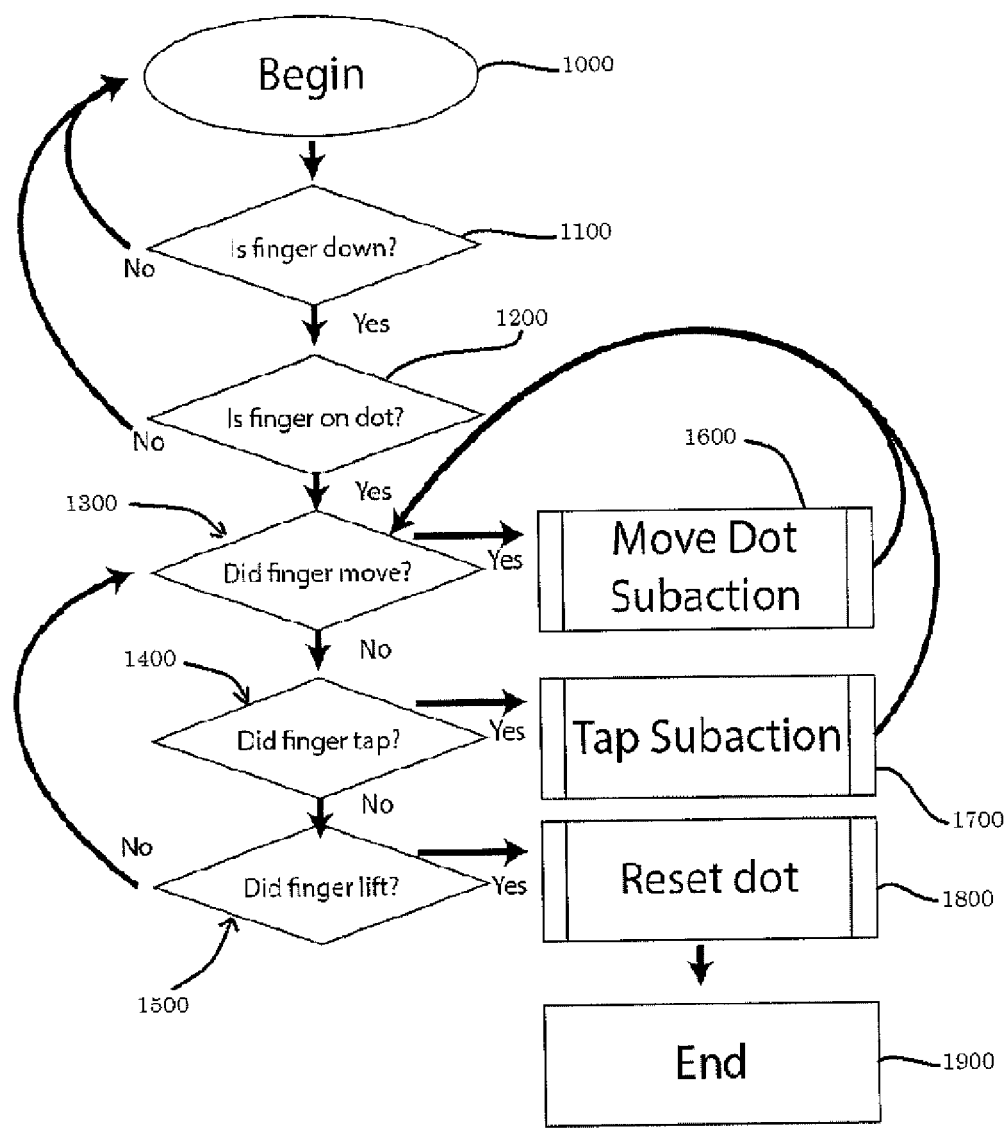
FIGS. 5A-5C illustrate a method of using and generating selection patterns in accordance with example embodiments.
Figure 5B:
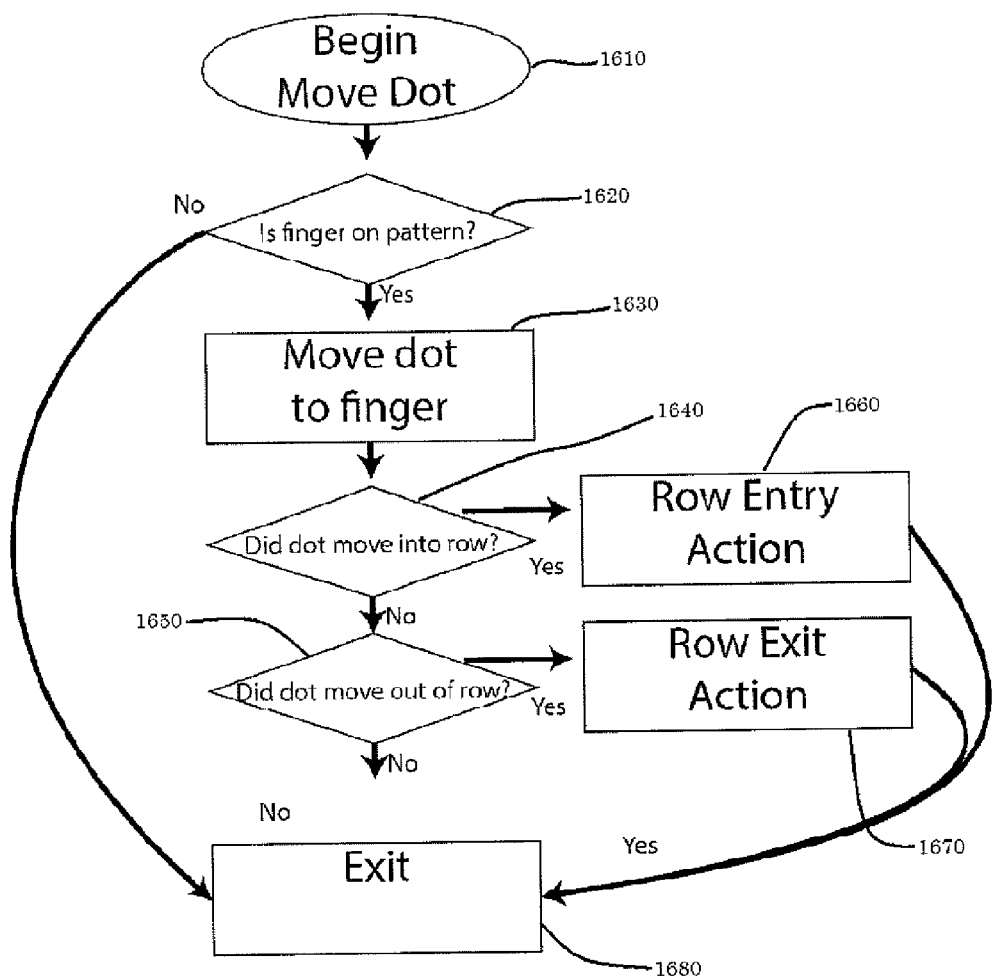
Figure 5C:
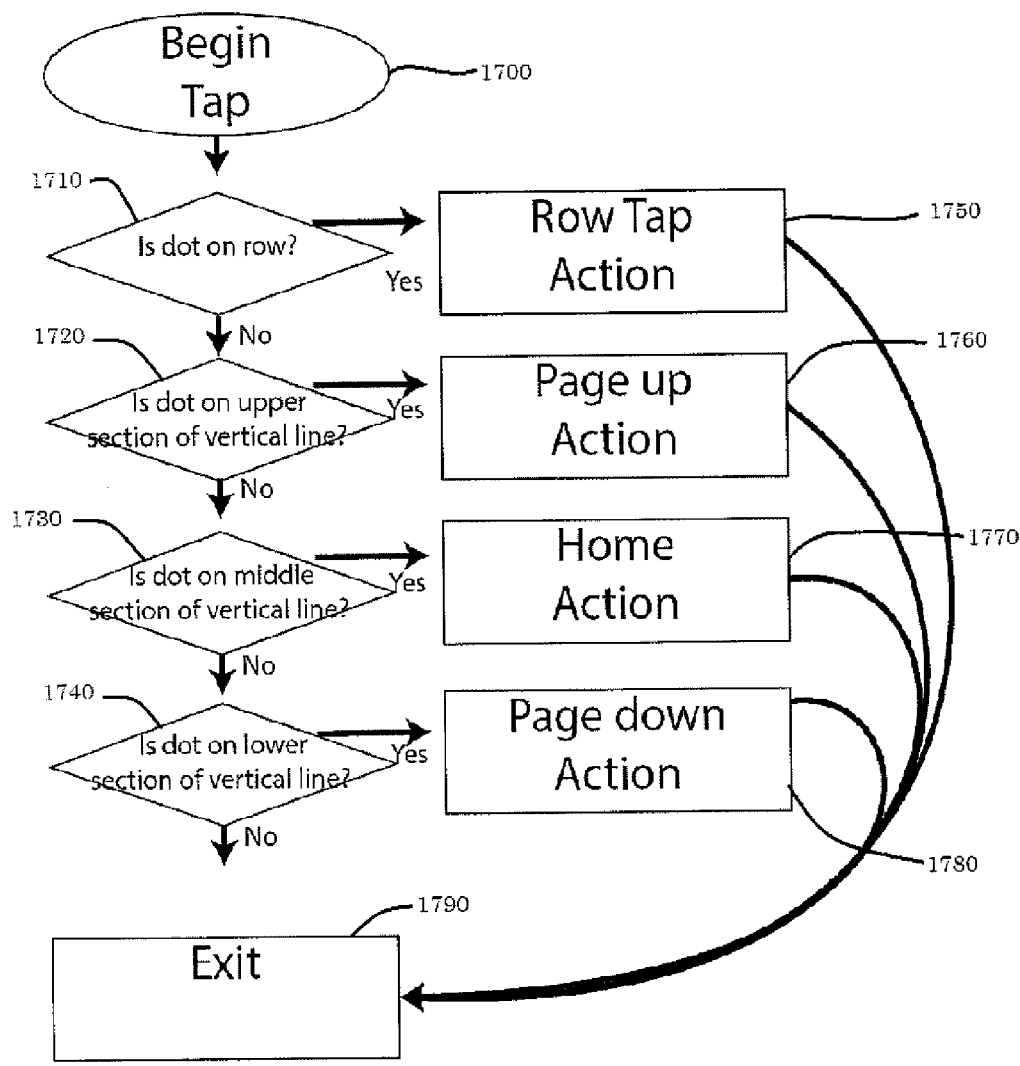

FIGS. 5A-5C illustrate a flow chart which provides an example method of generating selection patterns on a touch sensitive screen and using the selection patterns to make a selection. The process, for example, may be carried out on a hand held electronic device as was previously described, but may also be carried out on non hand held devices such as kiosks or ATMs. Referring to FIG. 5A, the example method begins at step 1000 wherein a processor has generated an initial selection pattern with a dot (for example, a pointer), thereon. In this example method a processor may initially determine whether or not a user's finger is contacting a touch sensitive area 1100. In the event the processor determines that a user's finger is contacting the touch sensitive screen 1100, the processor will determine whether the finger is contacting a region of the touch sensitive screen 1100 that corresponds to the dot on the touch sensitive screen 1200. In the event the processor determines the finger is not on a pointer or is not on the touch screen, the processor will loop back to operation 1000. However, if the processor determines that the finger is contacting the touch sensitive area and that the finger is on the dot, the processor will determine whether or not the finger is moving 1300. In the event the finger contacting the touch sensitive area associated with the dot moves, the processor will perform a move dot subaction 1600. In the alternative, if the processor determines the finger is not moving, the processor will determine whether the user is tapping his/her finger on the dot 1400. In the event the processor determines the user is tapping the pointer, the processor will perform a tap subaction 1700. In the event the processor determines that the finger is on the dot but is not moving or tapping, the processor will determine whether the user has lifted his or her finger from the touch sensitive area 1500. In the event the processor determines the user has lifted his/her finger from the touch sensitive area, the processor will perform a resetting operation 1800 which may end the process 1900. However, if the processor determines that the finger is on the dot but is not moving or tapping, the processor will continue to monitor the finger until it is determined that the finger either moves, taps, or is lifted from the touch sensitive screen.

FIG. 5B illustrates an example of the move dot subaction 1600. As shown in FIG. 5B, the move dot subaction 1600 may begin a dot moving operation 1610. In short, the processor will determine whether finger touching the touch sensitive area is moving along the selection pattern 1620. If the finger touching the touch sensitive area is moving along the selection pattern the processor will move the dot under the user's finger 1630. During the user's movement operation, if the processor determines that the user moves his finger into a "row" of the selection pattern, the processor may perform a row entry action 1660 why may result in the generation of a second selection pattern or may cause an application to execute. In the event the finger is contacting the touch sensitive screen and moves the dot out of a row 1650, the processor may perform a row exit action 1670 which may likewise result in the generation of another selection pattern or may cause a program to execute.

FIG. 5C illustrates an example of the tap subaction 1700. As shown in FIG. 5C, the processor may determine whether the dot is on a row 1710. In the event dot is on a row and the user taps the dot, the processor may perform a row tap action 1750 which may generate a new selection pattern or execute a program. In the event the dot is determined to be on an upper section of a vertical line of the selection pattern, and the user taps the upper section of the vertical line, the processor may perform a page up action 1760. In the event the dot is determined to be on a middle section of a vertical line of the selection pattern, and the user taps the middle section of the vertical line, the processor may perform a home action 1770. In the event the dot is determined to be on a lower section of the vertical line of the selection pattern, and the user taps the lower section of the vertical line, the processor may perform a page down action 1780.

Although the aforementioned method recites a "finger" as performing a tapping or moving operation, it is understood that this is not intended to be a limiting feature. For example, a stylus may alternatively be used in the above example method.

Figure 6:
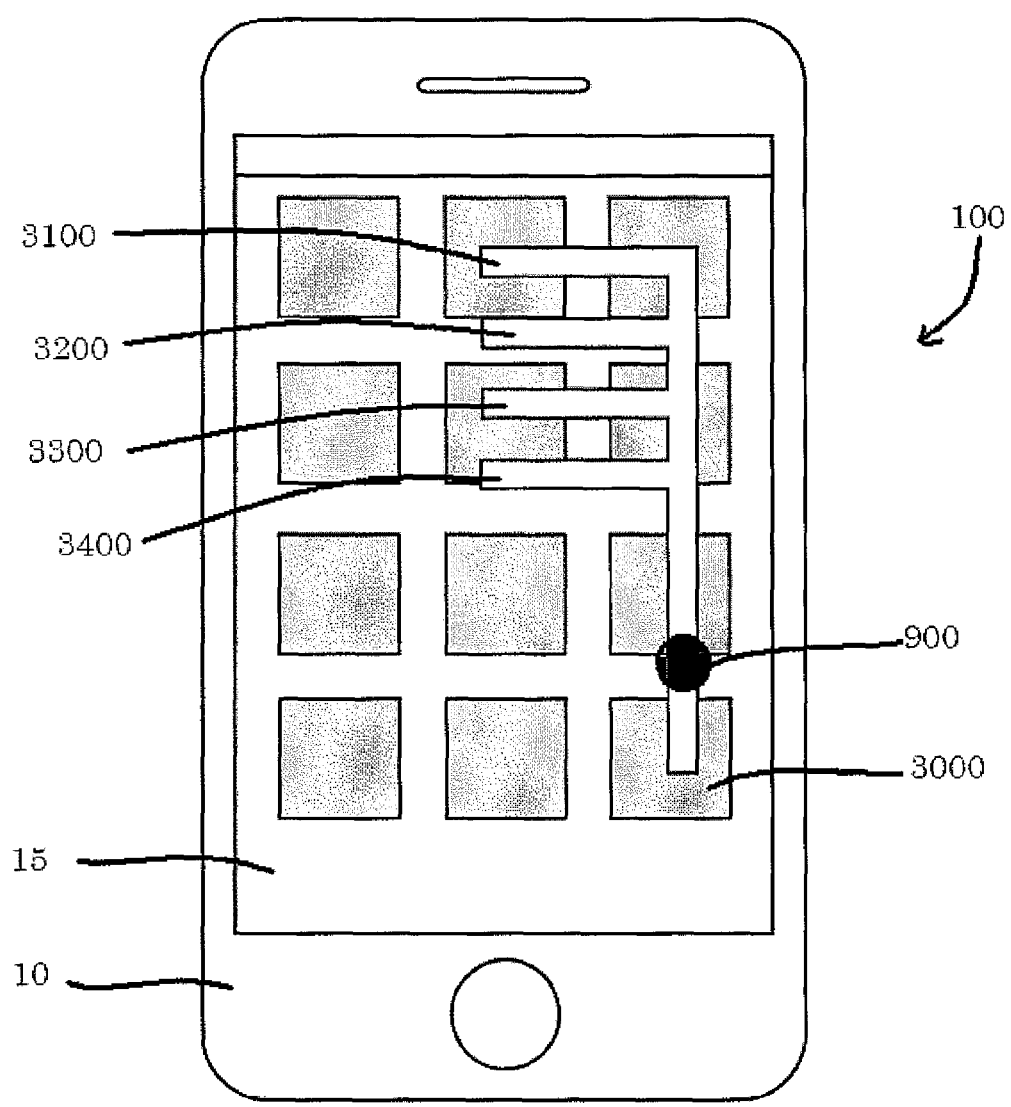
FIG. 6 illustrates an example of an electronic device having selection patterns generated thereon.

While example embodiments thus far have provided a general method of generating and using selection patterns and have provided specific nonlimiting examples of the aforementioned method, example embodiments are not limited thereto. For example, FIG. 6 illustrates a method for managing pictures that may be stored on an electronic device 100. As in the previous examples, the electronic device may include a touch sensitive area 15, for example, a touch screen, supported by a frame 10. Referring to FIG. 6, the electronic device 100 may have a plurality of pictures 3000 stored thereon. For example, as shown in FIG. 6, the electronic device 100 may store and display twelve pictures 3000. Example embodiments, however, are not limited thereto as there may be more than (or less than) twelve pictures stored in the electronic device 100. In example embodiments, a user may tap one of the pictures 3000 to generate a selection pattern having a pointer 900 imposed thereon. As in the previous nonlimiting examples, a user may move the pointer 900 along the selection pattern by touching an object, for example, a finger or a stylus, on the touch sensitive area 15 above the pointer 900 and may move the pointer by sliding the object along the selection pattern.

In example embodiments, the selection pattern may include a plurality of branches into which pointer 900 may be moved. For example, as shown in FIG. 6, the selection pattern may include a first branch 3100, a second branch 3200, a third branch 3300, and a fourth branch 3400. In example embodiments each of the branches may be used to accomplish a different result. For example, if a user were to move the pointer 900 into the first branch 3100, the picture may be uploaded to a first application, for example, facebook. Similarly, if the user were to move the pointer 900 into the second branch 3200, the picture may be uploaded to a second application, for example, twitter. Similar yet, if the user were to move the pointer 900 into the third branch 3300, the picture may be uploaded to a third application, for example, an email application. Similarly, if the user were to move the pointer 900 into the fourth branch 2300, the picture may be moved to an electronic folder managed by the electronic device 100, for example, a favorites folder.

Figure 7A:
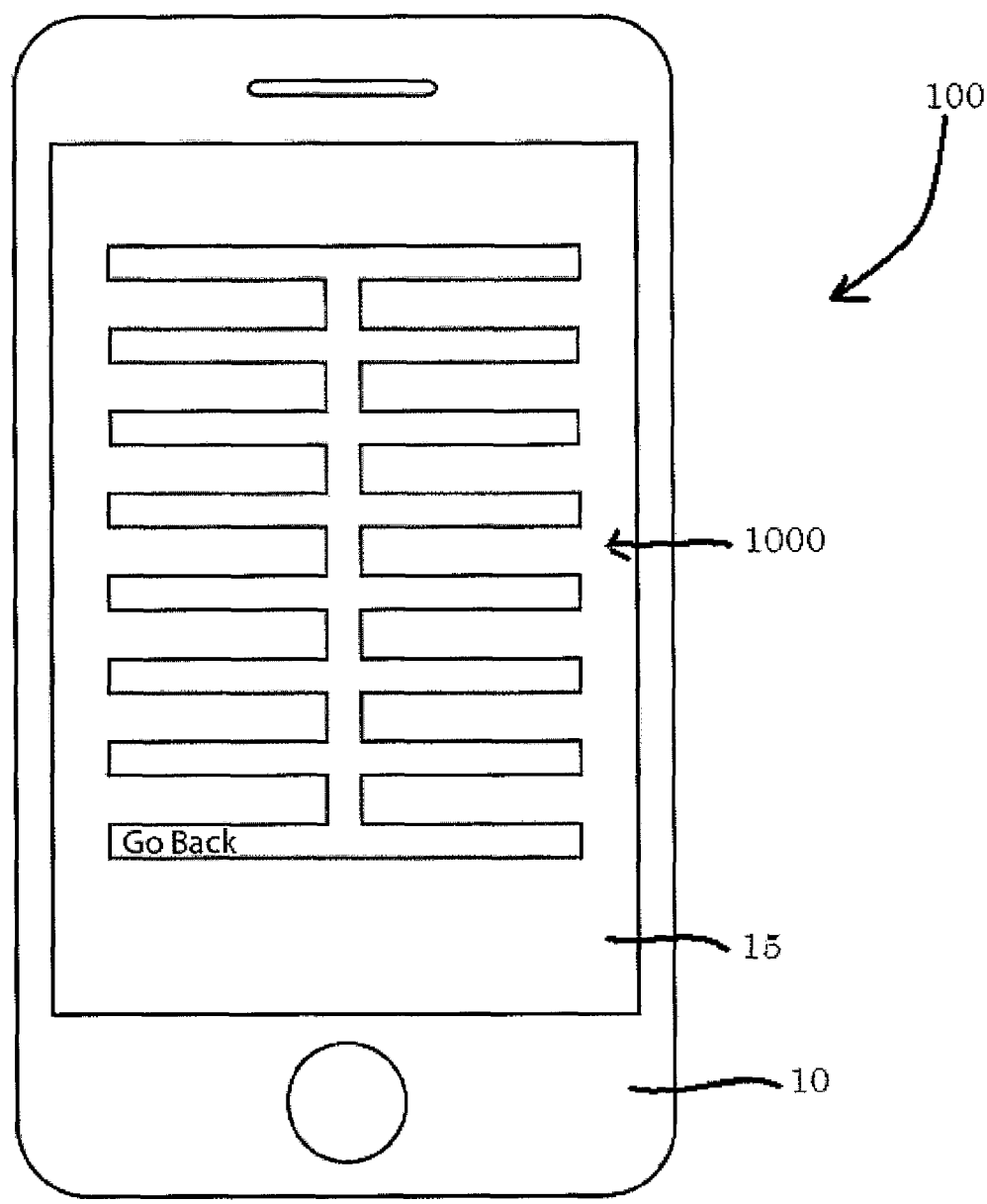
FIGS. 7A-7B illustrate examples of selection patterns in accordance with example embodiments.
Figure 7B:
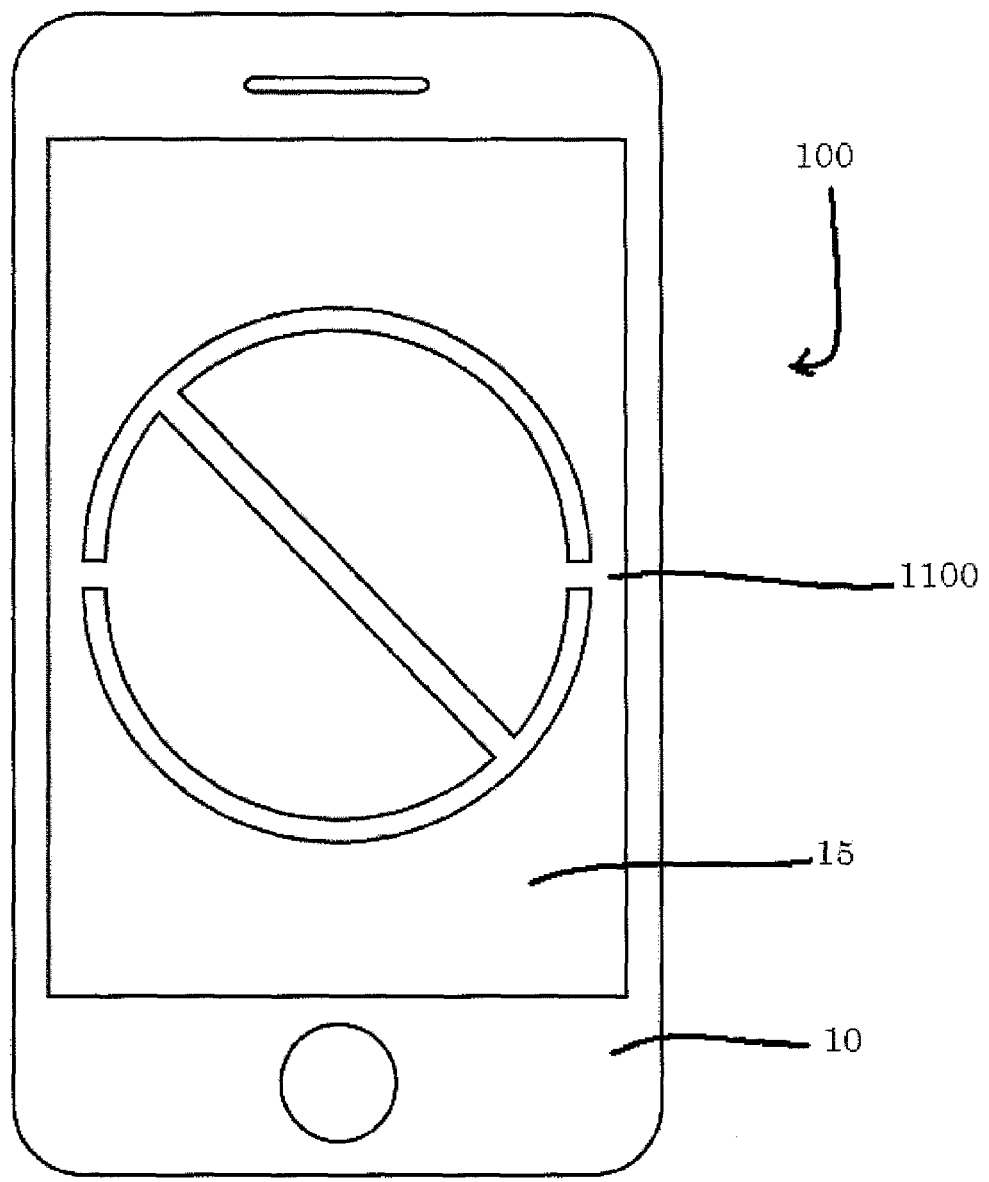

Although several examples of selection patterns have been provided in the previous examples, example embodiments are not limited thereto. For example, FIGS. 7A and 7B illustrate electronic devices 100 having a touch sensitive area 15 supported by a frame 10. FIGS. 7A and 7B illustrate different examples of selection patterns 1000 and 1100 which are unlike those presented above but which fall within the scope of example embodiments. Thus, while example embodiments use selection patterns to implement the present invention, the selection patterns are not limited by those depicted in the figures since various changes thereto fall within the scope and spirit of the invention.

In the previously described example embodiments, the selection patterns were generated by a processor of an electronic device 100 and displayed on a touch sensitive area 15 of the electronic device 100. In example embodiments, a pointer 900 was imposed on the example selection patterns and the pointer 900 was be moved by a user when the user contacted an object to the pointer 900 and moved the pointer 900 in a gliding manner. Example embodiments, however, are not strictly limited by the above examples. For example, a pointer may be generated after a user contacts a generated selection pattern. In addition, a pointer need not be generated since the electronic device 100 is capable of tracking the object being glided on the selection pattern. In addition, the selection patterns themselves need not be visually displayed. For example, muscle memory may allow for a user to remember certain selection patterns, thus, the selection patterns need not be generated visually after repeated use.

Figure 8:
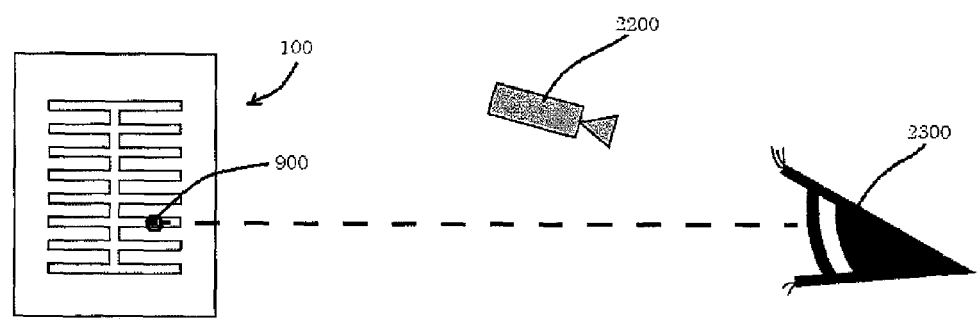
FIG. 8 illustrates an example of a system in accordance with example embodiments.

FIG. 8 illustrates another example of a method and system in accordance with example embodiments. In FIG. 8, however, a touch sensitive area 15 is not required to implement the inventive concepts. In lieu of having a user move a pointer 900 by pressing an object, for example, a finger or a stylus on a touch sensitive area, the system may include an eye tracking device 2200 which tracks the motion of a user's eye 2300. In the present system, a user may move a pointer 900 by looking at the pointer 900 and then visually tracing a path for the pointer 900 to follow. In this example, the pointer 900 may be moved to a representation by tracking eye motion through an eye tracking device 2200. In this particular nonlimiting example, the eye tracking device 2200 may send data to a processor of an electronic device 100.

The inventive concepts of example embodiments may be carried out on a conventional electronic device. For example, a i-phone may be programmed to generate and use selection patterns as described above. A nonlimiting example of code that may be used to program the i-phone is provided at the end of the description but before the claims. It should be emphasized that the example code is for the purpose of providing an example of the invention and is not meant to be a limiting feature of the invention. Furthermore, the code illustrates the inventor's possession of example embodiments as described above and below.

Figure 9A:
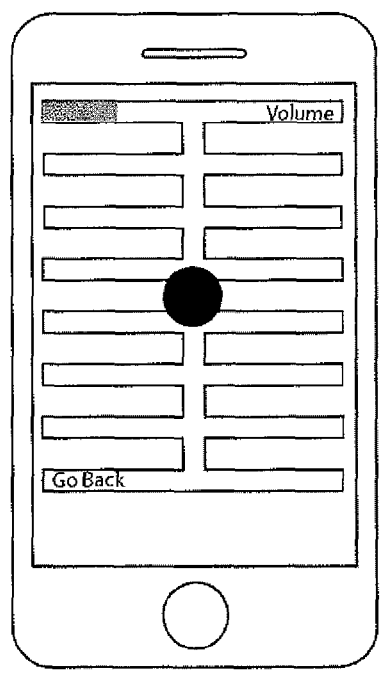
FIGS. 9A-9F illustrate an example of an electronic device having selection patterns generated thereon.
Figure 9B:
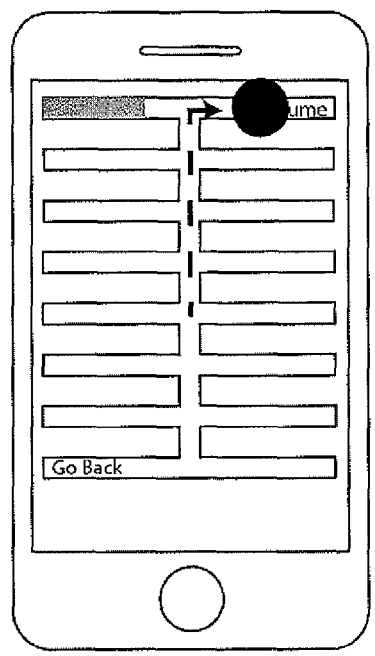
Figure 9C:
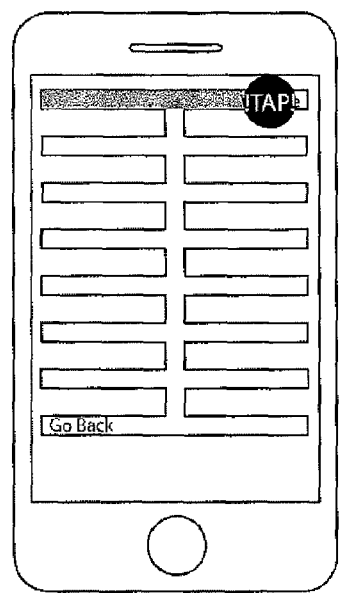
Figure 9D:
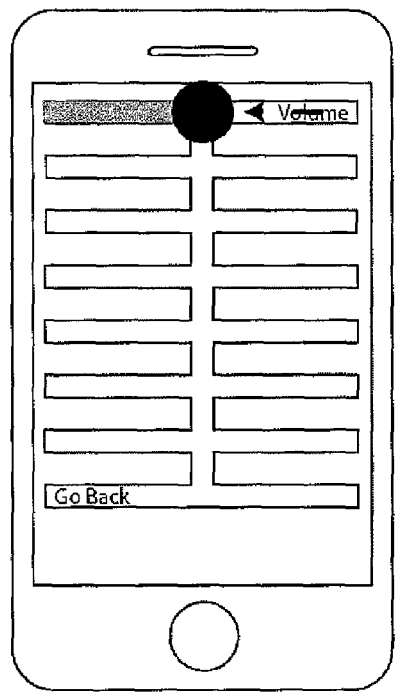
Figure 9E:
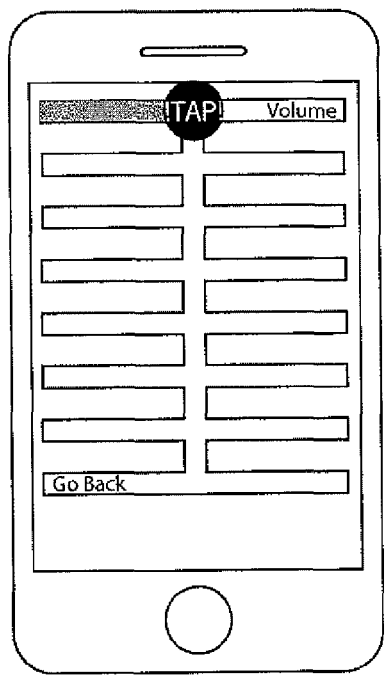
Figure 9F:
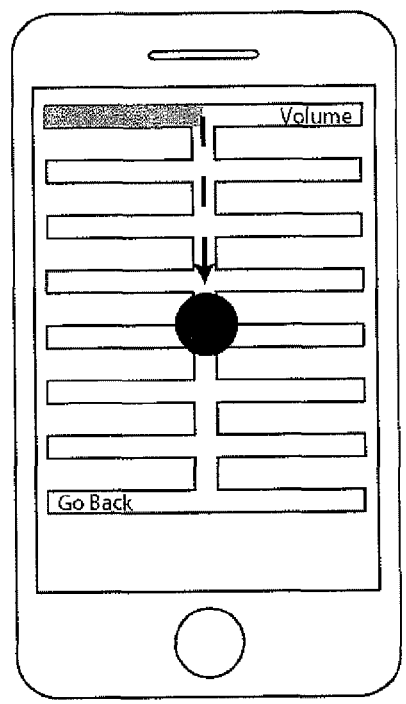

FIGS. 9A-9F represent another example of an electronic device using selection patterns in accordance with example embodiments. In FIGS. 9A-9F the selection pattern is used to illustrate a volume control of the electronic device. For example, in FIG. 9A, a user may see that a volume is about 20% of a maximum value by visually observing the gray indicator. In the event the user would like to increase the volume, the user may move the pointer 900 to the volume representation which may raise the volume incrementally until the volume is at a desired level. However, in example, embodiments, the user may tap the pointer 900 which may then place the interface in an analog mode as illustrated in FIG. 9C. In analog mode, the user may move the dot to a desired volume level, for example, about 50%, by moving the pointer along the indicator. Once the volume level is at the desired level, the user may simply tap the pointer to switch the apparatus back to normal mode. The user may then move the pointer away from the representation "volume" and the indicator stays at the desired volume level.

Figure 10A:
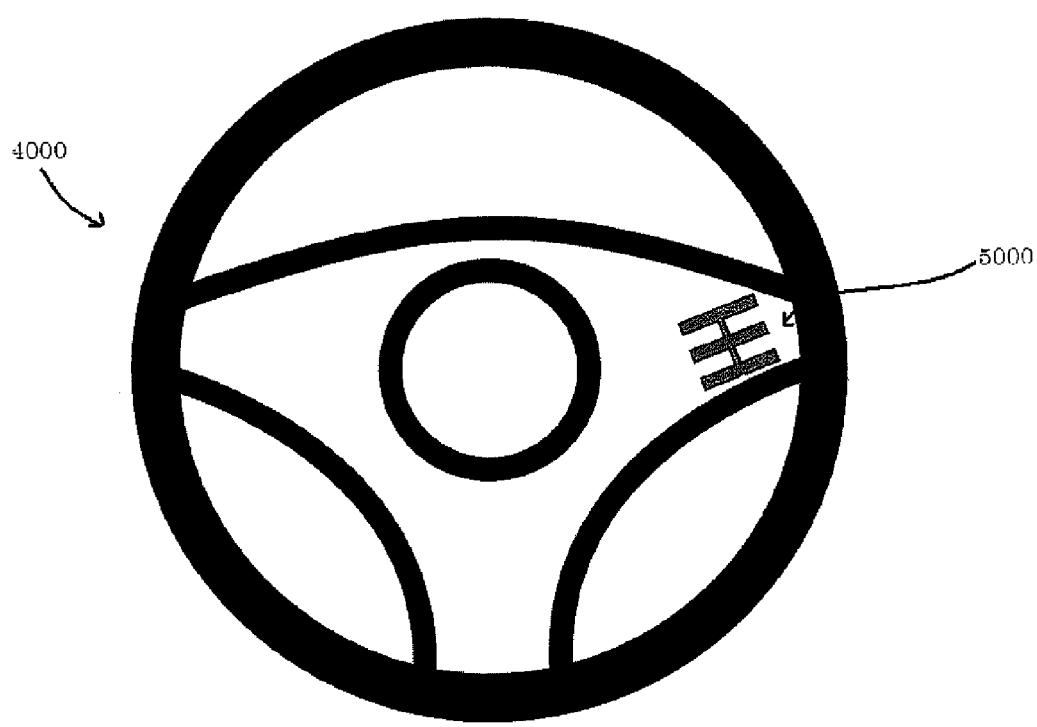
FIGS. 10A-10B illustrate an example of a steering wheel in accordance with example embodiments.
Figure 10B:
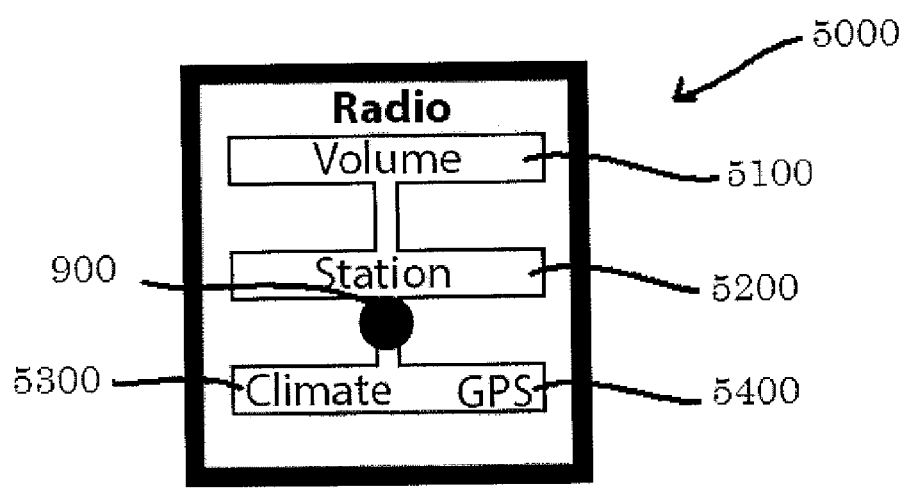

FIG. 10A illustrates a steering wheel 4000 in accordance with example embodiments. In example embodiments, the steering wheel 4000 may be equipped with a touchscreen which may, or may not include, a display. The touchscreen may include a selection pattern 5000 for controlling various features of the car. For example, as shown in FIG. 10B, the selection pattern 5000 may include a various representations associated with a volume of an audio device 5100 (for example, a car radio), a radio station 5200, a climate control 5300, and a GPS 5400. For example, in the event a user wanted to change a radio station, the user may touch the touchscreen and move his/her finger along the selection pattern 5000 to change a radio station. Similarly, if the user wanted to increase the volume of the radio station, the user may touch the touch screen at the branch of the selection pattern 5000 where volume is located, and move his/her finger back and forth along the volume branch to increase or decrease volume. In example embodiments, a display may be incorporated into a car's dashboard and the display may be configured to interface with the touchscreen. Thus, a user may visually inspect his/her actions on the selection pattern by viewing the display.

Applicants note example embodiments provide a novel and nonobvious interface which may greatly improve productivity of a user by providing the user with a number of selection patterns upon which a pointer may be moved. Repetitive use of the selection patterns may result in muscle memory that allows for an increase in efficiency as the methods are repeatedly used. In addition, example embodiments provide selection patterns which are unlike the conventional art in that the selection patterns of example embodiments may be at least bi-directional allowing a user to move a pointer in different directions to accomplish a task. Furthermore, given that the pointer's movement may be restricted to within a provided stroke path, errors from selecting erroneous selections may decrease at least because the pointer cannot cross more than selection (representation). Thus, example embodiments provide a method and apparatus which is not only novel and nonobvious, but a significant improvement over the conventional art.

While example embodiments have been particularly shown and described with reference to example embodiments thereof, it will be understood by those of ordinary skill in the art that various changes in form and details may be made therein without departing from the spirit and scope of the invention.

What we claim is:

1. A system comprising:
    a display device;
    an input device;
    a processor; and
    a non-transitory computer readable medium configured to cause the processor to:
        display, on a touch screen, a first selection pattern comprised of an elongated common path and a plurality of branches with menu items extending from the common path;
        display a pointer at a first point of origin within the first selection pattern;
        move the pointer along the elongated common path in response to an object gliding across the touch screen;
        replace the first selection pattern with a second selection pattern when a menu item is selected, wherein the selecting the menu item comprises the pointer being moved into one of the branches of the first selection pattern and then away from the menu item of the one of the branches of the first selection pattern, wherein the pointer is displayed in the second selection pattern at a second point of origin corresponding to a position associated with the selected menu item, wherein the first and second selection patterns are preprogrammed patterns and the non-transitory computer readable medium is configured to constrain movement of the pointer to the first selection pattern when the first selection pattern is displayed and constrain movement of the pointer to the second selection pattern when the second selection pattern is displayed; and
        return the pointer to the first point of origin or the second point of origin when the object is lifted off the touchscreen before a menu item associated with the first selection pattern or the second selection pattern is selected.

2. The system according to claim 1, wherein each of the first and second selection patterns include at least one menu item.

3. The system according to claim 2, wherein the processor is configured to move the pointer along at least one of the first and second selection patterns.

4. The system according to claim 1, wherein the second selection pattern is displayed directly after the first selection pattern is displayed.

5. The system according to claim 1, wherein the first selection pattern is a tree shaped pattern having a first plurality of menu items and the second selection pattern is a tree shaped pattern having a second plurality of menu items.

6. The system according to claim 1, wherein the input device is an eye tracking device.

7. A non-transitory computer readable medium configured to cause a processor to:
    display, on a touch screen, a first selection pattern comprised of an elongated common path and a plurality of branches with menu items extending from the common path;
    display a pointer at a first point of origin within the first selection pattern;
    move the pointer along the elongated common path in response to an object gliding across the touch screen;
    replace the first selection pattern with a second selection pattern when a menu item is selected, wherein the selecting the menu item comprises the pointer being moved into one of the branches of the first selection pattern and then away from the menu item of the one of the branches of the first selection pattern, wherein the pointer is displayed in the second selection pattern at a second point of origin corresponding to a position associated with the selected menu item, wherein the first and second selection patterns are preprogrammed patterns and the non-transitory computer readable medium is configured to constrain movement of the pointer to the first selection pattern when the first selection pattern is displayed and constrain movement of the pointer to the second selection pattern when the second selection pattern is displayed; and return the pointer to the first point of origin or the second point of origin when the object is lifted off the touchscreen before a menu item associated with the first selection pattern or the second selection pattern is selected.

8. The non-transitory computer readable medium according to claim 7, wherein the computer readable medium is configured to generate data in response to a touch on the touch screen.

9. The non-transitory computer readable medium according to claim 7, wherein the object is one of a stylus and a finger.

10. The non-transitory computer readable medium according to claim 7, wherein the common path is at least part of one of a tree type pattern and an arc type pattern.

11. The non-transitory computer readable medium according to claim 7, wherein the computer readable medium is configured to convert eye movement to data, and use the data to move the pointer along at least one of the first and second selection patterns.

12. The non-transitory computer readable medium according to claim 7, wherein the second selection pattern includes at least one new menu item.

13. The non-transitory computer readable medium of claim 7, wherein the common path is a closed loop.

14. The non-transitory computer readable medium of claim 7, wherein the common path is not a point.

15. The non-transitory computer readable medium of claim 7, wherein the plurality of branches are perpendicular to the elongated common path.

16. The non-transitory computer readable medium of claim 15, wherein the elongated common path resembles one of a line and a rectangle.

* * * * *